United States Patent
Messenger

(10) Patent No.: US 6,697,365 B1
(45) Date of Patent: Feb. 24, 2004

(54) METHOD OF LISTENER TRANSMITTED BROADCASTING

(76) Inventor: Charles Hayes Messenger, 19 Warwick Dr., Fairport, NY (US) 14450

(*) Notice: Subject to any disclaimer, the term of this patent is extended or adjusted under 35 U.S.C. 154(b) by 754 days.

(21) Appl. No.: 09/591,727

(22) Filed: Jun. 12, 2000

Related U.S. Application Data

(60) Provisional application No. 60/138,473, filed on Jun. 10, 1999.

(51) Int. Cl.[7] .............................................. H04L 12/56
(52) U.S. Cl. ...................... 370/390; 370/252; 370/408; 709/205; 709/252
(58) Field of Search ................................. 370/392, 400, 370/432, 401, 216, 408, 390, 473, 252, 254; 709/252, 238, 205

(56) References Cited

U.S. PATENT DOCUMENTS

| | | |
|---|---|---|
| 5,457,808 A | 10/1995 | Osawa et al. |
| 5,517,494 A * | 5/1996 | Green .......................... 370/408 |
| 5,541,927 A | 7/1996 | Kristol et al. |
| 5,606,669 A | 2/1997 | Bertin et al. |
| 5,778,187 A | 7/1998 | Monteiro et al. |
| 5,828,838 A | 10/1998 | Downs et al. |
| 5,831,975 A | 11/1998 | Chen et al. |
| 5,852,714 A | 12/1998 | Tseng et al. |
| 5,864,542 A | 1/1999 | Gupta et al. |
| 5,867,653 A | 2/1999 | Aras et al. |
| 5,892,761 A | 4/1999 | Stracke, Jr. |
| 5,905,871 A | 5/1999 | Buskens et al. |
| 5,963,547 A | 10/1999 | O'Neil et al. |
| 6,154,463 A * | 11/2000 | Aggarwal et al. .......... 370/408 |

OTHER PUBLICATIONS

K. Savetz et al., MBONE Multicasting Tomorrow's Internet, 1996, pp. 13–29, USA.
Ian Clarke, A Distributed Information Storage and Retrieval System, 1999, pp. 19–24, Division of Informatics, University of Edinburgh, Britain.

* cited by examiner

Primary Examiner—John Pezzlo

(57) ABSTRACT

The bandwidth of a group of Internet users, called listeners, is pooled, and that bandwidth is employed to broadcast a data stream, substantially concurrently, to those listeners. A broadcast manager coordinates the connections between the originator of the data stream and the listeners. The originator divides the data stream into a number of channels. Each channel is transmitted over a tree of interconnected listeners. A given listener in a given tree receives that channel from its parent in that tree, and retransmits the channel as it is received to its children in that tree. Each listener is present once in each tree, so the listener receives each channel once. Listeners combine the incoming channels to reproduce the originator's data stream. The result is that almost the entire transmission bandwidth required for the broadcast is provided by the listeners. In some embodiments, a given listener is required to transmit no more data than it receives. One or more channels may be redundant, providing some ability to bypass non-performing listeners. Feedback statistics are efficiently collected in the reverse direction over the same connections used for transmitting the channels. An application for a file server is described. A distributed broadcast manager is described.

44 Claims, 26 Drawing Sheets

Channel

| C1 | C2 | C3 | C4 |
|----|----|----|----|
| 0 | 1 | 2 | (3) |
| 4 | 5 | (6) | 7 |
| 8 | (9) | 10 | 11 |
| (12) | 13 | 14 | 15 |
| 16 | 17 | 18 | (19) |
| 20 | 21 | (22) | 23 |
| ⋮ | ⋮ | ⋮ | ⋮ | time ↓

} repeating pattern

FIG. 24a

Channel

| C1 | C2 | C3 | C4 | C5 |
|----|----|----|----|----|
| 0 | 1 | 2 | (3) | (4) |
| 5 | 6 | (7) | (8) | 9 |
| 10 | (11) | (12) | 13 | 14 |
| (15) | (16) | 17 | 18 | 19 |
| (20) | 21 | 22 | 23 | (24) |
| (15) | (16) | 17 | 18 | 19 |
| (20) | 21 | 22 | 23 | (24) |
| ⋮ | ⋮ | ⋮ | ⋮ | ⋮ | time ↓

} repeating pattern

FIG. 24b

METHOD OF LISTENER TRANSMITTED BROADCASTING

CROSS-REFERENCE TO RELATED APPLICATIONS

This application claims an invention which was disclosed in Provisional Application No. 60/138,473, filed Jun. 10 1999, entitled "VX multi-casting: self-broadcasting on the Internet". The benefit under 35 USC §119(e) of the United States provisional application is hereby claimed, and the aforementioned application is hereby incorporated herein by reference.

This application specifically refers to Disclosure Document Number 457266, filed Jun. 3 1999, titled "Method for server-less (or 'self-broadcasting') Internet multi-casting", and in Disclosure Document Number 457540, filed Jun. 4 1999, titled "Method for server-less (or 'self-broadcasting') Internet multi-casting (part 2)". These Disclosure Documents are hereby incorporated by reference.

BACKGROUND

1. Field of the Invention

The present invention pertains to the field of digital data communications. More particularly, it pertains to methods of transmitting data to multiple recipients over a global computer network.

2. Description of the Prior Art

As the Internet has become ubiquitous, broadcasting over the Internet has become ever more important. Broadcasting involves having a broadcast originator send a data stream (typically representing audio and/or video programming), substantially concurrently, to a large number of listeners. On the Internet, the typical listener is a user with a limited bandwidth connection to her Internet Service Provider, which in turn has a high bandwidth connection to the rest of the Internet. Typically, users are free to receive transmissions from, and send transmissions to, any other user or server on the Internet. In order to broadcast over the Internet, one of two general methods is currently employed. The first method makes use of standard unicast protocols which are universally implemented on the Internet. The second method makes use of a multicast protocol, implemented only on a known set of servers.

The first method, employing only unicast protocols, is illustrated in FIG. 1. Broadcast originator 100 sends the data stream which is to be broadcast to Unicast Server 104 through unicast connection 102a, in a series of unicast IP protocol packets. These packets are replicated on the Unicast Server, and retransmitted as unicast IP packets over individual unicast connections 102b to each listener 108. The main advantage of this method is flexibility. Because standard unicast IP protocols are used, there is no need for special software to run on the servers and routers which transmit data across the Internet. All a broadcaster needs is a Unicast Server with enough transmission bandwidth to support the desired number of listeners. The main drawbacks are cost, because transmission bandwidth is expensive, and scalability, because there may be practical limits to the obtainable transmission bandwidth.

The second method, employing a multicast protocol, is illustrated in FIG. 2. Broadcast originator 100 sends the broadcast data stream to one of a known set of linked Multicast Servers 110 over multicast connection 112a. A multicast connection consists of a series of packets using a multicast protocol. Unlike a unicast packet, which is addressed to a single recipient, a multicast packet is addressed to multiple recipients. When a Multicast Server processes a multicast packet, it may replicate and forward it to one or more other Multicast Servers over multicast connections 112b. Packets are also forwarded directly to listeners 108 over multicast or unicast connections 113. Ideally, packet replication takes place at the server which is closest to a given listener, thus minimizing bandwidth usage. An example of a non-proprietary, non-commercial implementation of multicasting is described by K. Savetz et al. in *MBONE Multicasting Tomorrow's Internet* (IDG Books WorldWide, Inc., 1996). An example of a proprietary commercial implementation is provided by the Real Broadcast Network (http://www.realnetworks.com/rbn). The main advantage of IP multicasting is efficient utilization of bandwidth. The main disadvantage is that special software must be run on the servers and routers across which the data is transmitted. There is currently no IP multicasting protocol which is universally implemented on the Internet. As a consequence, non-commercial implementations suffer from a lack of availability. Commercial implementations are costly, and require a burdensome amount of coordination with the commercial provider, thus minimizing flexibility.

There are several programs which are used to disseminate files across the Internet using unicast connections, without the need to host the files on a central server. Examples include Napster (http://www.napster.com), Gnutella (http://gnutella.wego.com), and The Free Network Project (http://freenet.sourceforge.net). Using these programs, a directory is maintained showing which users have which files. When a first user wants to download a specific file, she references the directory, and selects a second user currently hosting the file. The second user transmits the file upon request over a unicast connection to the first user. Once the file has been received, the first user is then generally registered in the directory as having that file. In this manner, files are disseminated between users. While these methods are suitable for distributing files, they are not applicable to disseminating a continuous broadcast.

There is a need for an Internet broadcasting method which benefits from the flexibility and universality of a unicasting system, while avoiding the cost and scalability problems associated with conventional unicast broadcasting methods based on centralized servers; a method which benefits from the advantage of a multicasting system in terms of minimizing the broadcaster's transmission bandwidth requirements, while avoiding the cost and inflexibility of commercial multicasting methods, and the lack of availability of non-commercial multicasting methods. Such a method would result in a tremendous cost savings to broadcasters, offering them unprecedented freedom of action.

SUMMARY

The bandwidth of a group of Internet users, called listeners, is pooled, and that bandwidth is employed to broadcast a data stream, substantially concurrently, to those listeners. A broadcast manager coordinates the connections between the originator of the data stream and the listeners. The originator divides the data stream into a number of channels. Each channel is transmitted over a tree of interconnected listeners. A given listener in a given tree receives that channel from its parent in that tree, and retransmits the channel as it is received to its children in that tree. Each listener is present once in each tree, so the listener receives each channel once. Listeners combine the incoming channels to reproduce the originator's data stream. The result is that almost the entire transmission bandwidth required for the broadcast is provided by the listeners. In some embodiments, a given listener is required to transmit no more data than it receives. One or more channels may be redundant, providing some ability to bypass non-performing listeners. Feedback statistics are efficiently collected in the reverse direction over the same connections used for transmitting the channels. An application for a file server is described. A distributed broadcast manager is described.

The phrase "substantially concurrently" is used with the understanding that there is some delay inherent to each transmission and retransmission step, so that Listeners do not receive the broadcast exactly simultaneously as it is transmitted by an Originator.

DRAWING FIGURES

FIG. 24a shows a pattern of Frame numbers to be used with on-demand redundancy, with 4 Channels and one redundant Channel.

FIG. 24b shows a pattern of Frame numbers to be used with on-demand redundancy, with 5 Channels and two redundant Channels.

REFERENCE NUMERALS IN DRAWINGS

Figure 1:
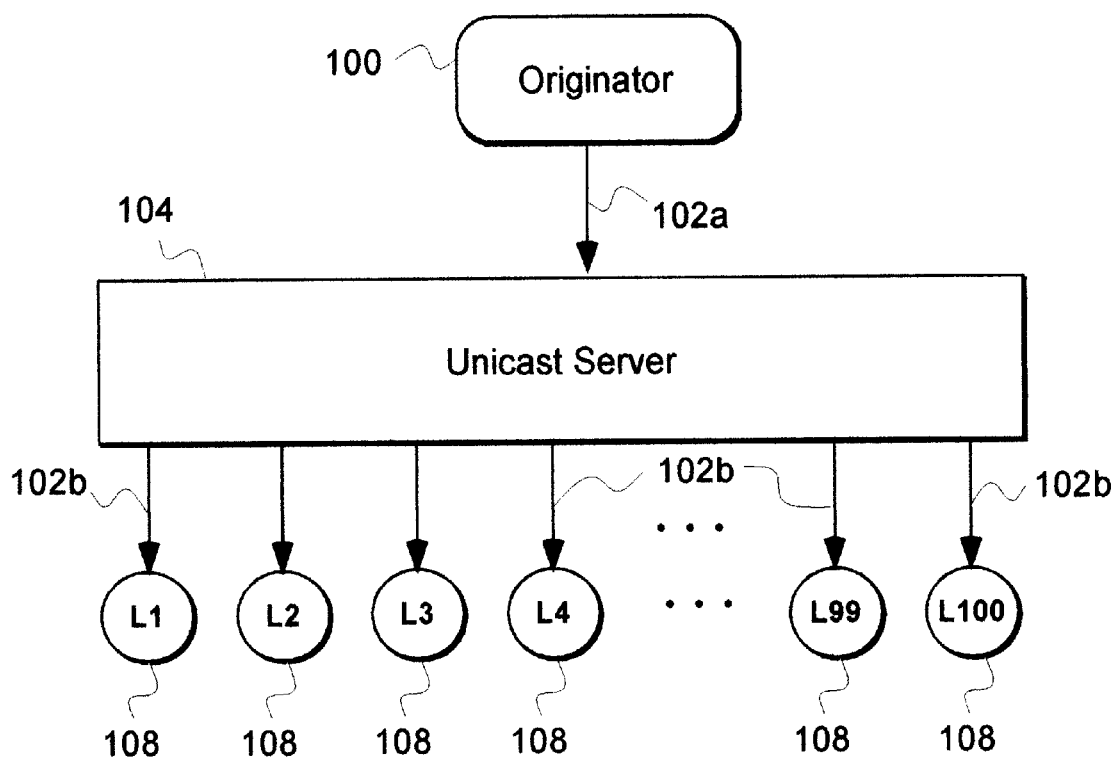
FIG. 1 shows a prior art system employing UP unicasting.
Figure 2:
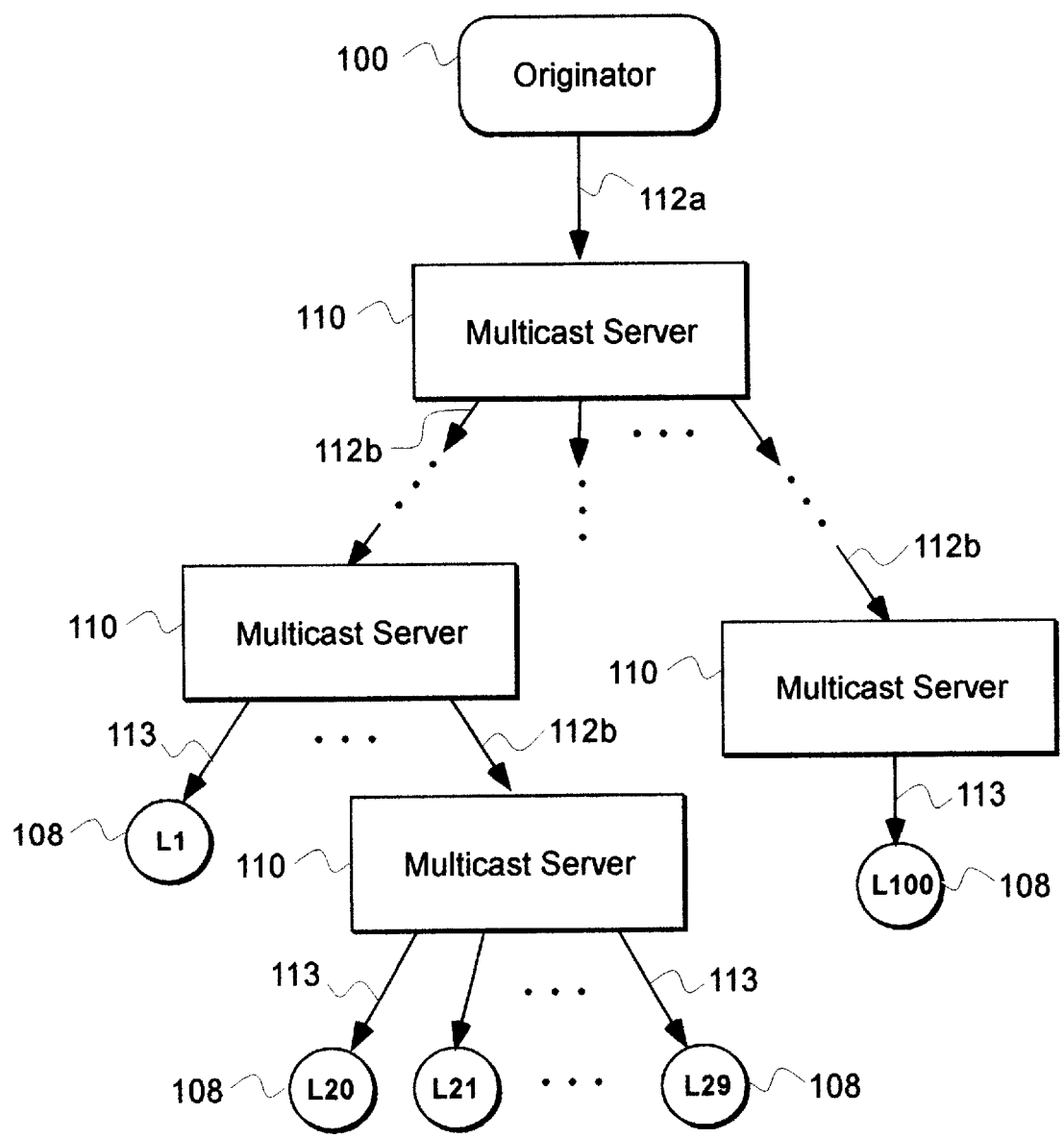
FIG. 2 shows a prior art system employing multicasting.

A numeral with a letter suffix represents a particular instance of the general type represented by the numeral.

| | |
|---|---|
| 100 | broadcast originator (Originator) |
| 102 | unicast IP protocol connection for broadcast data (Feed Connection) |
| 104 | Unicast Server |
| 108 | user receiving broadcast (Listener) |
| 110 | Multicast Server |
| 112 | multicast protocol connection |
| 113 | unicast or multicast protocol connection |
| 114 | Broadcast Manager |
| 116 | intermittent unicast connection to Broadcast Manager (Control Connection) |
| 130–148 | flowchart steps to join an LTB network. |
| 150–160 | flowchart steps to modify LTB network |
| 170 | tree of connected Listeners (Tree) |
| 200 | Channel Slot |
| 202 | Child Slot |
| 204 | Frame replication data path |
| 206 | Frame collection data path |
| 208 | anti-jitter buffer |
| 210 | Data Stream sink |
| 212 | Data Stream source |
| 214 | Frame Former |
| 218 | Frame Combiner |
| 220 | reverse direction feedback connection (Feedback Connection) |
| 240–278 | flowchart steps for Placement Algorithm |
| 280 | LTB file server |
| 282 | File on LTB file server |
| 284 | LTB network |
| 290 | conferencing server |
| 292 | media stream |
| 294 | conferencing application |
| 296 | conference participant |
| 300 | generation functions for algebraic redundancy method |
| 302 | regeneration function set for algebraic redundancy method |
| 320–334 | flowchart steps for generalized Placement Algorithm |
| 340 | LTB Sub-network |
| 342 | Dedicated Listener |
| 344 | overall Broadcast Manager |
| 346 | Feed Connection set |

| Defined Terms | |
|---|---|
| Backup Frame | In the context of an LTB network with on-demand redundancy, a Frame which is not sent, but can be requested as needed in case of a failure to receive a Frame. |
| Balanced LTB | An LTB network where the Fanout equals the number of Channels. |
| bandwidth | A time-dependant measure of the size of the Data Stream or Channel, typically expressed in terms of bits per second. When one bandwidth is said to be lower than another, then the Data Stream or Channel associated with the former contains less data than the Data Stream or Channel associated with the latter. Data Streams and Channels are each assigned a maximum bandwidth, below which the bandwidth may vary. |
| Branch Listener | In the context of a given Tree, a Listener which can have children in that Tree. |
| Branch Tree | In the context of a given Listener, a Tree within which that Listener may have children. |
| Broadcast Data | Any data representing a portion of the Data Stream. |
| Broadcast Manager | One or more programs running on one or more computing devices which coordinate the interconnections within an LTB network. |
| Channel | Sequentially numbered Frames are derived from the Data Stream. These Frames are divided evenly between a number of Channels. The Channels can later be recombined to produce the Data Stream. So, a Channel consists of a series of Frames. |
| Channel Slot | A placeholder within a Listener to which a Feed is attached. There is one Channel Slot corresponding to each Channel. |
| Child | A Listener to which the Originator or a second Listener sends a Channel. The first Listener is called a Child of the Originator or second Listener. A given Listener may be a Child of its Feed multiple times -- as many as one time for each Channel. A first Listener may be the Child of a second Listener on one or more Channels, while the second is the Child of the first on one or more different Channels. |
| Child Slot | A placeholder within a Listener or Originator to which a Child's Feed Connection is attached. In some embodiments, multiple Child Slots are occupied by a single Feed Connection, in proportion to the bandwidth of the corresponding Channel. |
| Clean Disconnection | A method of disconnecting a Feed Connection purposefully, using a Disconnect Object, so the disconnection is not considered by the Feed or Child to be a Fault. |
| Complainer | A Listener or Originator sending a Complaint Object to the Broadcast Manager. |
| Complaint Object | Sent to the Broadcast Manager to notify it of a Fault. |
| Connect Object | Sent to a Listener from the Broadcast Manager instructing it to form a new Feed Connection. |
| connection | In the context of a network connection, the word refers to a unicast connection. The word is also used outside of the context of a network connection, to refer to a connection in a pattern being maintained by the Broadcast Manager. |
| Control Connection | Intermittent unicast connection between the Broadcast Manager and either the Originator or a Listener, over which control objects are sent and received, but no Broadcast Data. |
| Data Stream | That which is being broadcast. The purpose of an LTB broadcast is to replicate a Data Stream (originating at the Originator) at each of a plurality of Listeners, substantially concurrently, at a predetermined maximum bandwidth. |
| Departure Object | Sent by a Listener to the Broadcast Manager, notifying it of the Listener's intention to leave the broadcast. |
| derive | When a packet or Channel is said to be derived from a set of other packets or Channels, respectively, it means the former packet or Channel is the result of applying a formulaic manipulation to the members of the set. The word includes the case of making a copy of one of the members of the set. In the case of a redundant LTB network, each Channel can be derived from one or more other Channels. |
| Disconnect Object | Sent over a Feed Connection, in either direction, to instruct the other end not to report a coming disconnection as a Fault. Used to perform a Clean Disconnection. |
| Failed Object | Sent by a prospective new Listener to the Broadcast Manager, to indicate a failure to establish a Feed Connection. |
| Fanout | The number of Child Slots a Listener or Originator has; hence, in most embodiments, the maximum number of Children the Listener or Originator may have. If all Listeners (not necessarily the Originator) have the same Fanout, the LTB network is said to have that Fanout. The Originator's Fanout is an even multiple of the number of Channels, greater than or equal to the number of Channels. A Listener's Fanout can be any number, in principle. In the preferred embodiment, each Listener's Fanout is equal to the number of Channels. In some embodiments, one or more Channels may require multiple Child Slots. In this case, the Fanout refers strictly to the number of Child Slots, and not to the maximum number of Children. |

-continued

Defined Terms

| Term | Definition |
|---|---|
| Fault | The condition where a Listener or Originator fails to receive expected Broadcast Data within some timeout interval, or where a connection is unexpectedly lost. |
| Feed | A Listener or Originator from which a second Listener receives a Channel. The Listener or Originator is called a Feed of the second Listener. Each Listener has one Feed for each Channel. Two or more Feeds may be the same Listener. |
| Feed Connection | A bi-directional connection consisting of a continuous series of unicast packets in which a Channel is sent in one direction, and an intermittent series of packets in which feedback data is sent in the other direction. If the Channel is being received by a Listener, it is called that Listener's Feed Connection. If the Channel is being transmitted to a Child, it is called a Feed Connection of the Child. Each Listener has one Feed Connection for each Channel. Broadcast Data is disseminated through an LTB network exclusively over Feed Connections. |
| Feedback Connection | In a context where feedback is being sent over a Feed Connection, in the reverse direction as the Channel is being sent, it can be referred to as a Feedback Connection. |
| Frame | The Data Stream is formatted into a series of sequentially numbered units, called Frames. Frames are divided equally between the Channels. In most embodiments, Frames are equally sized. |
| Frame Combiner | Takes a Frame Set as input, and produces the corresponding Data Stream as output. |
| Frame Former | Takes a Data Stream as input, and produces a Frame Set as output. |
| Frame Set | One Frame from each Channel, consecutively numbered, with the lowest numbered Frame being from the first Channel. Missing Frames of a Frame Set can be regenerated from the other Frames in the set. |
| Frame Set Block | In the context of an LTB network with on-demand redundancy, a set of N Frame Sets over which a fixed pattern is repeated of transmitting vs. retaining Frames, where N is the number of Channels. |
| Generation Function | A function by which a Channel is computed as a linear combination of Real Channels. |
| Initiate Object | Sent by a Listener to an Originator or another Listener, to initiate a Feed Connection. |
| instructing | In some embodiments, the Broadcast Manager instructs Originators and Listeners by means of objects sent over unicast connections. In some of those embodiments, instruction objects for a Listener are forwarded one or more times by other Listeners before being received. |
| Join Object | Sent to the Broadcast Manager by a Prospect, requesting to join the LTB network. |
| Keepalive Object | Sent from a Listener to one of its Children, of the corresponding Feed Connection, to keep the Child from reporting a Fault in the event that no Frames are being transmitted over the Feed Connection. |
| Leaf Listener | In the context of a given Tree, a Listener which is always a leaf node of that Tree. |
| Leaf Tree | In the context of a given Listener, a Tree within which that Listener is assigned to always be a leaf node. |
| Listener | A computing device connected as an end node to a global packet switched network, which is receiving a Data Stream over an LTB broadcast, and which can convert the Data Stream into a form perceivable by a human. The term excludes servers and routers. Listeners can communicate with Originators, Broadcast Managers, and other Listeners through peer-to-peer connections, also called unicast connections, over the network. |
| LTB | Listener-Transmitted Broadcasting, the invention being disclosed. The acronym LTB is used as an adverb or adjective. An LTB network consists of a Broadcast Manager, an Originator, and a group of Listeners which are substantially concurrently receiving a Data Stream from the Originator. An LTB broadcast is a broadcast employing the present invention. |
| LTB Sub-network | A local LTB network controlled by a local Broadcast Manager. An LTB network can be split into multiple LTB Sub-networks. |
| Modification Object | The Placement Algorithm produces a number of Modification Objects. Each object specifies a new Feed Connection for a Listener. |
| Node | A position within a Tree. Since each Listener occupies one node in each Tree, when the context indicates which Tree is being referred to, "Listener" can be used in place of "Node". |
| Offender | A Listener or Originator named as the source of a Fault in a Complaint Object. |
| Originator | A program running on a computing device connected as an end node to a global packet switched network, which is sending a Data Stream over an LTB broadcast. An Originator can communicate with Broadcast Managers and Listeners through peer-to-peer connections, also called unicast connections, over the network. |
| Overflow Bytes | Extra bytes added in the most-significant position to every Frame, to avoid arithmetic overflow during computation of the Generation Functions and Regeneration Functions. |

-continued

| Defined Terms | |
|---|---|
| Placement Algorithm | Applied by the Broadcast Manager to rearrange the LTB network interconnections in order to accommodate a change, such as adding or removing a Listener or Originator. |
| Prospect | A Listener which is attempting to join an LTB network. |
| Real Channel | Used in a context of a fractionally redundant LTB network; the Data Stream is evenly divided into a number of Real Channels. These are combined using the Generation Functions to produce the Channels, which are in turn broadcast over the Trees. Channels are translated back to Real Channels using Regeneration Functions. |
| Real Frame | A Real Frame is to a Frame as a Real Channel is to a Channel. A Real Channel is composed of a series of Real Frames. |
| receiving | All acts of receiving over a network employ unicast protocols. |
| Refused Object | Sent by Broadcast Manager to a prospective Listener, informing her that her request to join has been refused. |
| Regeneration Function | A function by which a Real Channel is computed as a linear combination of Channels. |
| sending | All acts of sending over a network employ unicast protocols. |
| transmitting | All acts of transmission over a network employ unicast protocols. |
| Tree | A tree of Listeners, over which a Channel is broadcast. The Originator transmits each Channel to the root of the Channel's Tree. |
| unicast | Peer-to-peer. In the context of the Internet, unicast implies the use of Transmission Control Protocol (TCP) or User Datagram Protocol (UDP), possibly operating through a proxy. |

DETAILED DESCRIPTION OF THE INVENTION

Figure 3:
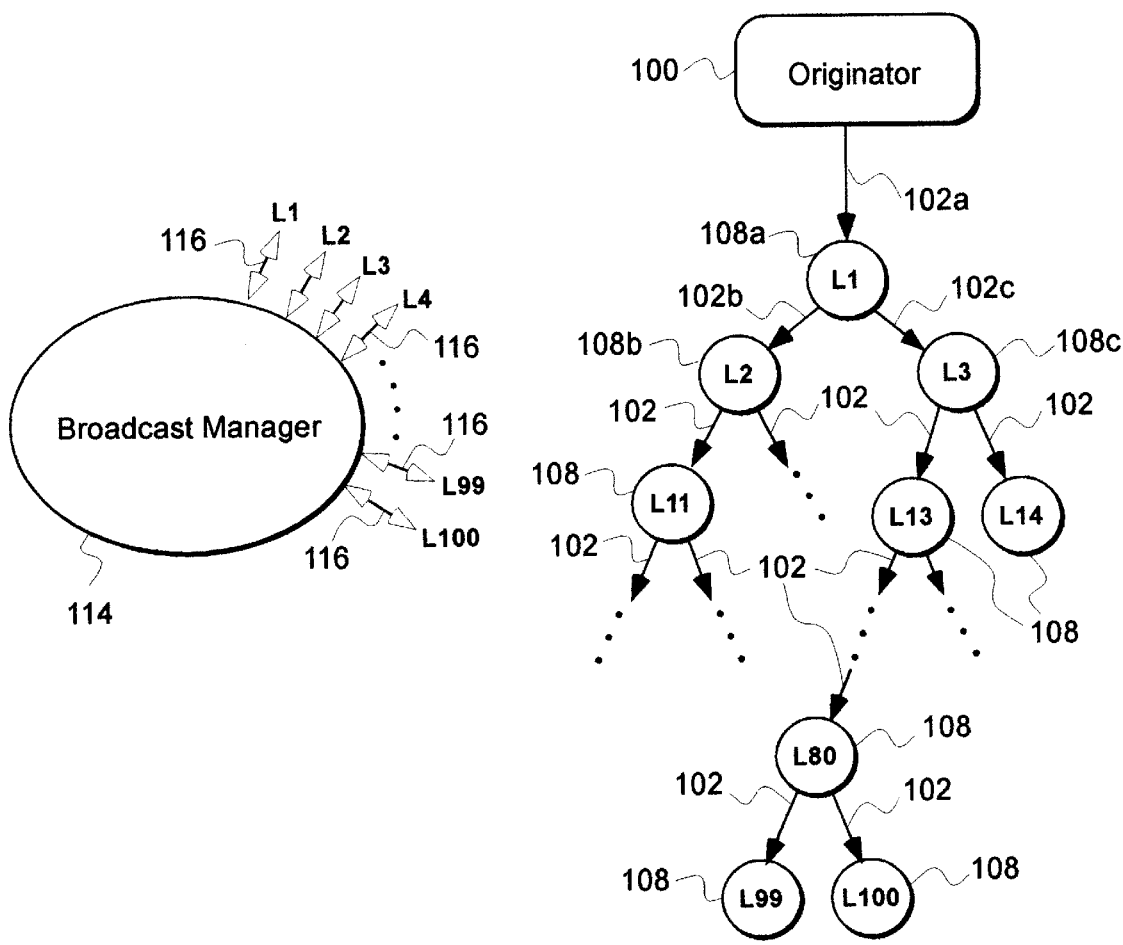
FIG. 3 shows a single Channel embodiment of a Listener-Transmitted Broadcast network, or LTB network.

FIG. 3—Single Channel Embodiment

A Listener-Transmitted Broadcast (LTB) network employs users who are receiving the broadcast (called Listeners) to retransmit the broadcast data stream, as they receive it, to other Listeners. Thus, the broadcaster needs to transmit only one copy of the broadcast data stream. In effect, the transmission bandwidth is supplied by the Listeners. Because Internet users typically do not pay extra to transmit data, and because they typically make relatively little use of their available transmission bandwidth, the cost to Listeners of retransmission is typically minimal. Even when the cost to Listeners is not minimal, the invention still has value in that it allows the cost of the broadcast to be borne by the listening audience—a form of listener-supported broadcasting.

A simple embodiment of the present invention is illustrated in FIG. 3. Broadcast originator 100, called the Originator, disseminates a continuous stream of data representing the broadcast content, called the Data Stream, over a packet-switched network to a number of users 108 and 108a–c, called Listeners, who are substantially concurrently receiving the Data Stream. The Originator forms the Data Stream into a series of sequentially numbered units, called Frames. These Frames are transmitted to Listener 108a (L1). The Frames are sent over unicast connection 102a, as a continuous series of unicast EP protocol packets.

A Listener or Originator from which a second Listener receives Frames is referred to as a Feed for the second Listener. The connection over which a Listener receives Frames from a Feed is called a Feed Connection. Hence, the Originator is L1's Feed, and 102a is L1's Feed Connection. L1 replicates the incoming Data Stream coming through 102a as it is received, retransmitting it to Listeners 108b (L2) and 108c (L3), over Feed Connections 102b and 102c, respectively. A Listener to which the Originator transmits Frames is called a Child of the Originator. A Listener to which another Listener retransmits Frames is called the latter Listener's Child. Hence, L2 and L3 are Children of L1.

Each Listener 108 likewise replicates the Data Stream as it is received over its Feed Connection, and retransmits it to its Children, if any, over unicast IP connections 102.

Broadcast Manager 114 maintains tables representing a pattern of interconnections between the Originator and Listeners. It coordinates their actions in such a way as to cause the pattern of interconnections to be brought into being. In the single-Channel embodiment of FIG. 3, the Broadcast Manager is a single program. It can run on a different computer than the Originator. The Broadcast Manager maintains an intermittent unicast EP protocol connection 116, called a Control Connection, to the Originator and to each Listener. Through these connections the Broadcast Manager sends instructions, receives requests to enter and leave the broadcast, and is informed of the status of the connections. As long as no Originator or Listeners join or leave, and there are no interruptions of data flow requiring status messages to be sent, the Control Connections remain inactive. Any data derived from the Data Stream is called Broadcast Data. Broadcast Data is never sent to the Broadcast Manager. An LTB network is a network of interlinked Listeners substantially concurrently receiving a Data Stream from an Originator, as coordinated by a Broadcast Manager.

In any LTB network, the Data Stream is sent at some defined maximum bandwidth. In the preferred embodiment, and the present embodiment, this maximum bandwidth remains fixed for the life of the LTB network. In other embodiments, it is possible to change the maximum bandwidth.

In general, an LTB network consists of a number of trees of interconnected Listeners, called Trees. The Data Stream is split into a number of parallel data substreams, called Channels. Each Channel has a maximum bandwidth equal to a fraction of the maximum bandwidth of the Data Stream. The Channels can be combined to reform the Data Stream. Each Channel is transmitted over its own Tree. The Originator transmits each Channel to the root Listener of each Channel's Tree. In the present embodiment, there is one Channel and one Tree. A position within a Tree is referred to as a Node. A given Listener exists as a single Node in each Tree. Therefore, when the context indicates which Tree is being referred to, the term Listener is used unambiguously in place of Node. In a given Tree, each Listener has one parent Listener (called the Parent, or Feed), and may have any number of child Listeners (Children).

In the current embodiment, each Listener has a maximum of two Children. The maximum number of Children a Listener may have is called that Listener's Fanout. If every Listener in an LTB network has the same Fanout, the LTB network is said to have that Fanout. Otherwise, the LTB is said to have an irregular Fanout. The current embodiment, then, is a 1-Channel LTB network with a Fanout of 2.

The pattern of interconnections making up a Tree is referred to as the Tree's Topology. In the current embodiment, the Tree is binary, and the interconnections are arranged so that the depth of the Tree is minimized. With this Topology, conventionally called a balanced binary tree, in the context of the LTB network illustrated in FIG. 3, it can be seen by one skilled in the art that the maximum number of steps between any Listener and the Originator is given by:

$$1+\text{floor}[\log_2(N)]$$

where the floor operator produces the greatest integer less than or equal to its operator, and where N is the total number of Listeners.

Between each pair of Listeners is a Feed Connection, over which a relatively small delay (in practice, typically under a second) is added to the Data Stream, for various reasons. Because the maximum number of steps increases only as the log of the number of Listeners, the maximum delay will remain manageably small, even as the number of Listeners grows large. With 500 Listeners, the maximum number of transmission steps from the Originator to any Listener would be 9. Assuming a maximum 1 second delay per transmission step, the maximum delay would be 9 seconds. For broadcasting purposes, this is considered to be manageably small.

Note that the terms Originator, Listener and Broadcast Manager are each used to refer to one or more programs running on computers which are connected to the Internet (or, more generally, to any packet switched network). These programs communicate with each other using an appropriate Application Programming Interface (API), transported in unicast EP protocol packets over that network. One or more of the programs may run on the same computer, but in the preferred embodiment, they all run on different computers. The Originator and Listeners are each run on a single computer. In the preferred embodiment, the Broadcast Manager is also run on a single computer. However, it other embodiments, it is run in a distributed manner across several computers.

In the preferred embodiment, the packet switched network is the Internet, which uses the IP protocol. The basic unicast protocols available under the IP protocol include the Transmission Control Protocol (TCP/IP) and the User Datagram Protocol (UDP/IP). In the preferred embodiment, TCP/IP is used for all connections, including Feed Connections and Control Connections. Another embodiment uses the UDP/IP protocol. Another embodiment uses HTTP tunneling, whereby communications are wrapped in the HTTP protocol used to transfer web pages. Use of the HTTP tunneling allows operation through many existing firewalls. Another embodiment is designed to work with proxying protocols, which allow a proxy server, with one IP address, to service multiple users attached to the proxy server over a local network.

In various embodiments, the Data Stream consists of audio programming, video programming, multimedia programming, and advertising information. It is clear that the invention can be applied to a variety of other content. The Data Stream may consist of compressed programming, which is decompressed by the Listeners.

Figure 4:
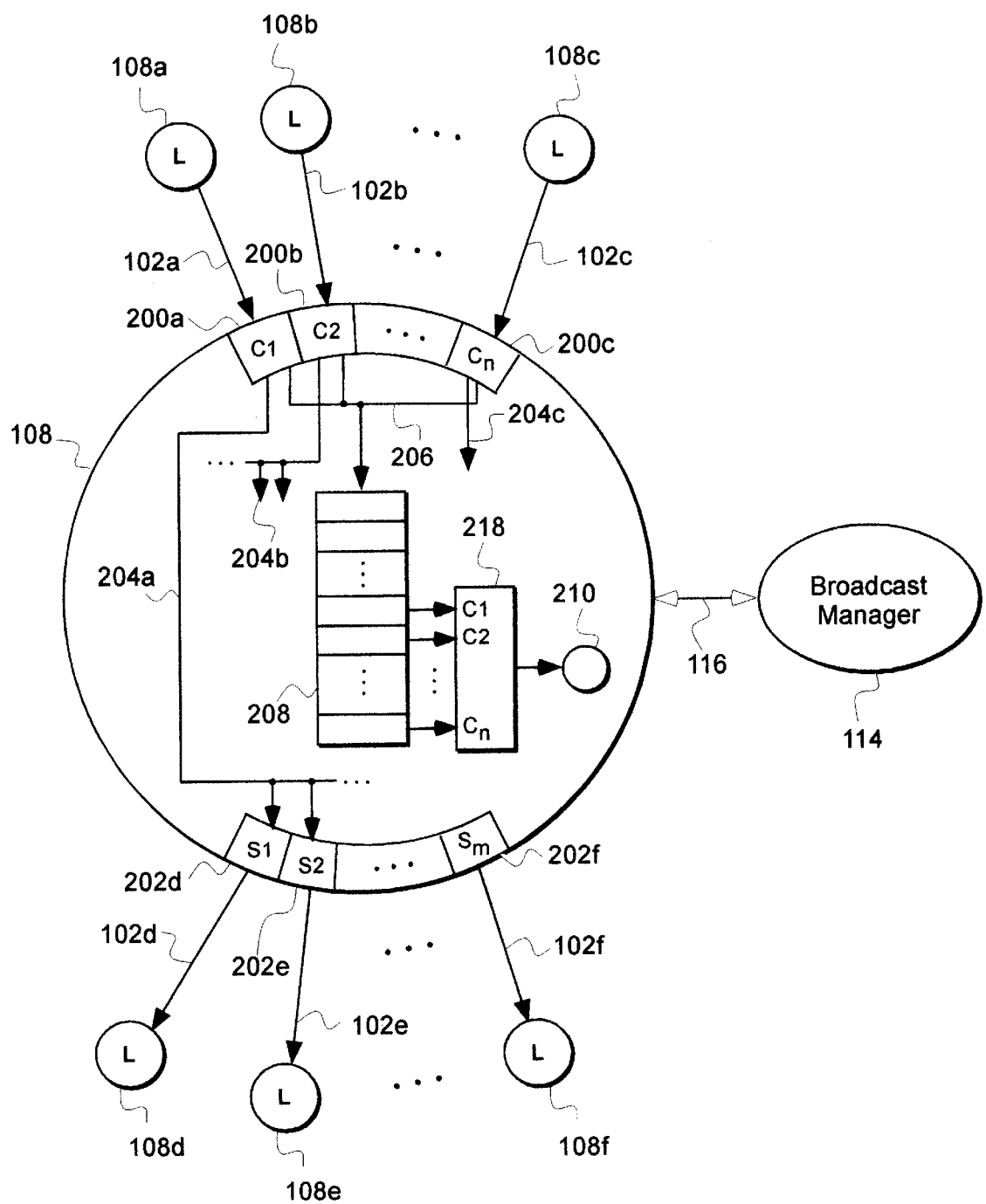
FIG. 4 shows the connections to and within a Listener.

FIG. 4—Listener Connections

FIG. 4 illustrates a given Listener 108 in a generalized LTB network with n Channels and a Fanout of m. Broadcast Manager 114 issues instructions to the Listener over Control Connection 116. These instructions tell the Listener which other Listeners to connect to, and how to connect to them. In this way the Broadcast Manager controls the pattern of data interconnections between and within Listeners and the Originator. The Listener sends Complaint Objects and Departure Objects to the Broadcast Manager over the Control Connection. In response to these objects, the Broadcast Manager may make modifications to the LTB network.

The present Listener, here referred to as L, has n Feed Connections, one for each Channel, each coming from an associated Feed. Two or more of the Feeds may be the same Listener. Feed Connections are connected to a Child Slot on the transmitting side, and a Channel Slot on the receiving side. Listener 108a is L's Channel 1 Feed. Feed Connection 102a connects from this Feed to L's first Channel Slot 200a (C1). Listener 108b is L's Channel 2 Feed. Feed Connection 102b connects from this Feed to L's second Channel Slot 200b (C2). Listener 108c is L's Channel n Feed. Feed Connection 102c connects from this Feed to L's n'th Channel Slot 200c (Cn). A given Listener's Feed Connection for Channel c is always connected to its Channel Slot c.

Within each Tree, the Listener has zero or more Children. The Listener has m Child Slots 202 to which these Children are connected. The number of Child Slots a Listener has is called the Listener's Fanout. If all Listeners have the same Fanout, then m must be greater than or equal to n, in order that there be sufficient Fanout to connect n Channels to each Listener. In the single-Channel embodiment of FIG. 3, n is 1 and m is 2. When m is equal to n, the LTB network is said to be Balanced. Thus, the single-Channel embodiment of FIG. 3 is non-Balanced.

A given Child Slot may or may not be used, and if used may be associated with any Channel. Three instances of Children are illustrated. Feed Connection 102d to Child 108d emanates from Child Slot 1 202d (S1). Feed Connection 102e to Child 108e emanates from Child Slot 2 202e (S2). Feed Connection 102f to Child 108f emanates from Child Slot m 202f (Sm).

Data for a given Channel c arrives at Channel Slot c in a series of numbered units, called Frames. These Frames are collected along data path 206 and fed into anti-aliasing buffer 208. The purpose of the anti-aliasing buffer is to sort the Frames into sequential order, and to accommodate late-arriving Frames. Frames are taken in at an irregular rate, and possibly out-of-order. Some delay is added, and the Frames are re-ordered. The Frames are then produced in sequential order (increasing frame numbers) at the required rate, and are fed into processing unit 218, called a Frame Combiner. A set of consecutively numbered Frames, one from each Channel, the lowest-numbered Frame being from the first Channel, is referred to as a Frame Set. The Frame Combiner takes Frame Sets as in put, and recombines them to form the Data Stream as output. In the case of a Redundant LTB network, one or more missing Frames may be tolerated. Otherwise, any missing Frames result in a gap in the resulting Data Stream.

The re-formed Data Stream is then fed to Data Stream sink 210. The term "sinking" in reference to a Data Stream refers to the act of using the Data Stream. The Data Stream sink can be various things, such as speakers for an audio broadcast, or speakers plus a monitor for a video broadcast, or a disk file, or yet another broadcasting mechanism such as a telephone. In the preferred embodiment, the Data Stream is standard GSM compressed speech, at 13 kbps, and the Data Stream sink is a GSM decompression module, whose decompressed waveform output is sent to a sound card with attached speakers.

The Frames arriving from a given Channel Slot may be replicated and copied to any number of Child Slots. Frames arriving at Channel Slot 200a (C1), from the Channel 1 Feed 108a, are replicated along data path 204a, and copied to any subset of Child Slots. They are illustrated being copied to the first Child Slot 202d (S1), the second Child Slot 202e (S2), and to unspecified other Child Slots. Frames arriving at Child Slot 202d are copied over Feed Connection 102d to Listener 108d. Frames arriving at Child Slot 202e are copied over Feed Connection 102e to Listener 108e. Frames arriving at Child Slot 202f are copied over Feed Connection 102f to Listener 108f. Listeners 108d, 108e and 108f are referred to as L's Children.

By convention, Child Slots and Channel Slots are not explicitly shown in the figures. The left-most Feed Connection emanating from the lower half of a diagrammed Listener is considered to be connected to that Listener's Child Slot 1, the next to Child Slot 2, and so on. The left-most Feed Connection entering the upper half of a diagrammed Listener is considered to be connected to. Channel Slot 1, the next to Channel Slot 2, and so on.

Figure 5:
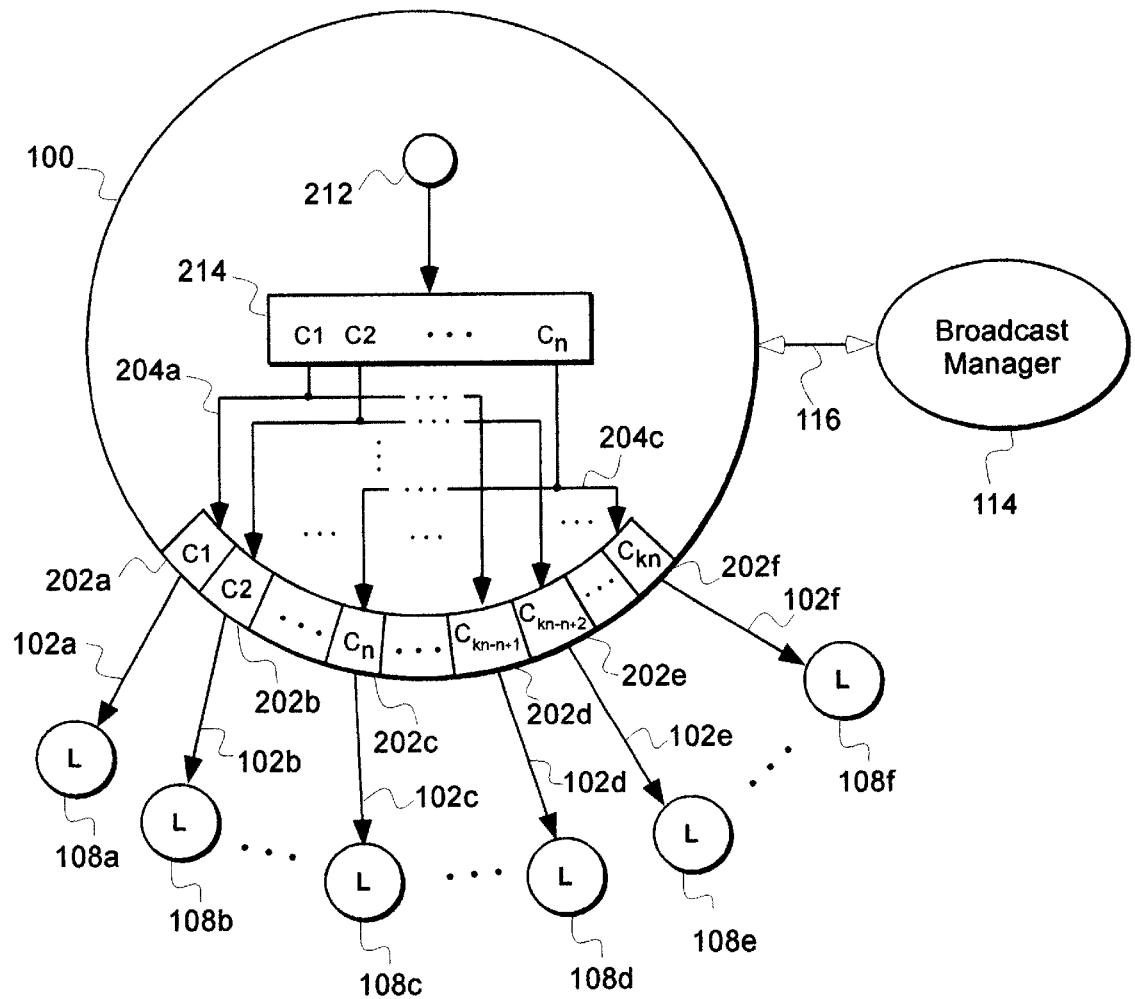
FIG. 5 shows the connections to and within the Originator.

FIG. 5—Originator Connections

FIG. 5 illustrates Originator 100 of an n-Channel LTB network, where the Originator has a Fanout of k times n. Each LTB network has a single Originator. The Originator transmits each Channel to the root Listener of the Channel's Tree. The Data Stream to be broadcast is acquired at Data Stream source 212. The term "sourcing" refers to the act of acquiring a Data Stream for broadcasting. There are various possible sources for the Data Stream, including live input such as from a microphone or video camera, pre-recorded media such as an MPEG file, a live conference, or another broadcast which is being re-broadcast over an LTB network. In the preferred embodiment, the Data Stream source is a microphone whose waveform is fed into a GSM compression module, GSM being a standard for representing speech at 13 kbps.

The Data Stream is fed into processing unit 214, called the Frame Former. The Frame Former takes a Data Stream as input, applies some processing (which may add redundancy), and formats the resulting stream into a series of sequentially numbered Frames, which are evenly divided between n Channels. Every n'th Frame goes to the same Channel. In most embodiments, unless otherwise indicated, the Frames are of equal size. In some embodiments, the Frames for different Channels may be of different sizes. In other embodiments, where the Data Stream is of variable bandwidth, the Frame sizes may be variable up to some maximum size.

The Frames for each Channel are copied to one or more Child Slots. The number of Child Slots is an even multiple k of the number of Channels n, there being k Child Slots per Channel. In FIG. 5, Channel 1 Frames are replicated along data path 204a, and copied to Child Slots 202a, 202d, and unspecified other Child Slots. Channel 2 Frames are replicated and copied to Child Slots 202b, 202e, and unspecified other Child Slots. Channel n Frames are replicated and copied to Child Slots 202c, 202f, and unspecified other Child Slots.

If there is a Listener attached to a Child Slot, then any Frames copied to the Child Slot are transmitted over the Feed Connection leading to that Listener. Frames copied to the first Child Slot 202a are transmitted over Feed Connection 102a to Listener 108a. Frames copied to Child Slots 202b–f are likewise transmitted over attached Feed Connections 102b–f to attached Listeners 108b–f, respectively. The Listeners to which the Originator sends data (108a–f in the fig.) are called the Originator's Children. The Originator has k Children for each Channel. Among each set of n Children, one or more may be the same Listener.

In the preferred embodiment, k is 1, so there are n Child Slots, 1 for each Channel. In the single-Channel embodiment of FIG. 3, k is 1, and n is 1, so there is one Child Slot, to which all Frames are copied. In other embodiments, n and k may each be any number, 1 or greater.

The Originator is connected to Broadcast Manager 114 over Control Connection 116. The Broadcast Manager sends instructions over this connection, while receiving information on the status of connections.

Figure 6:
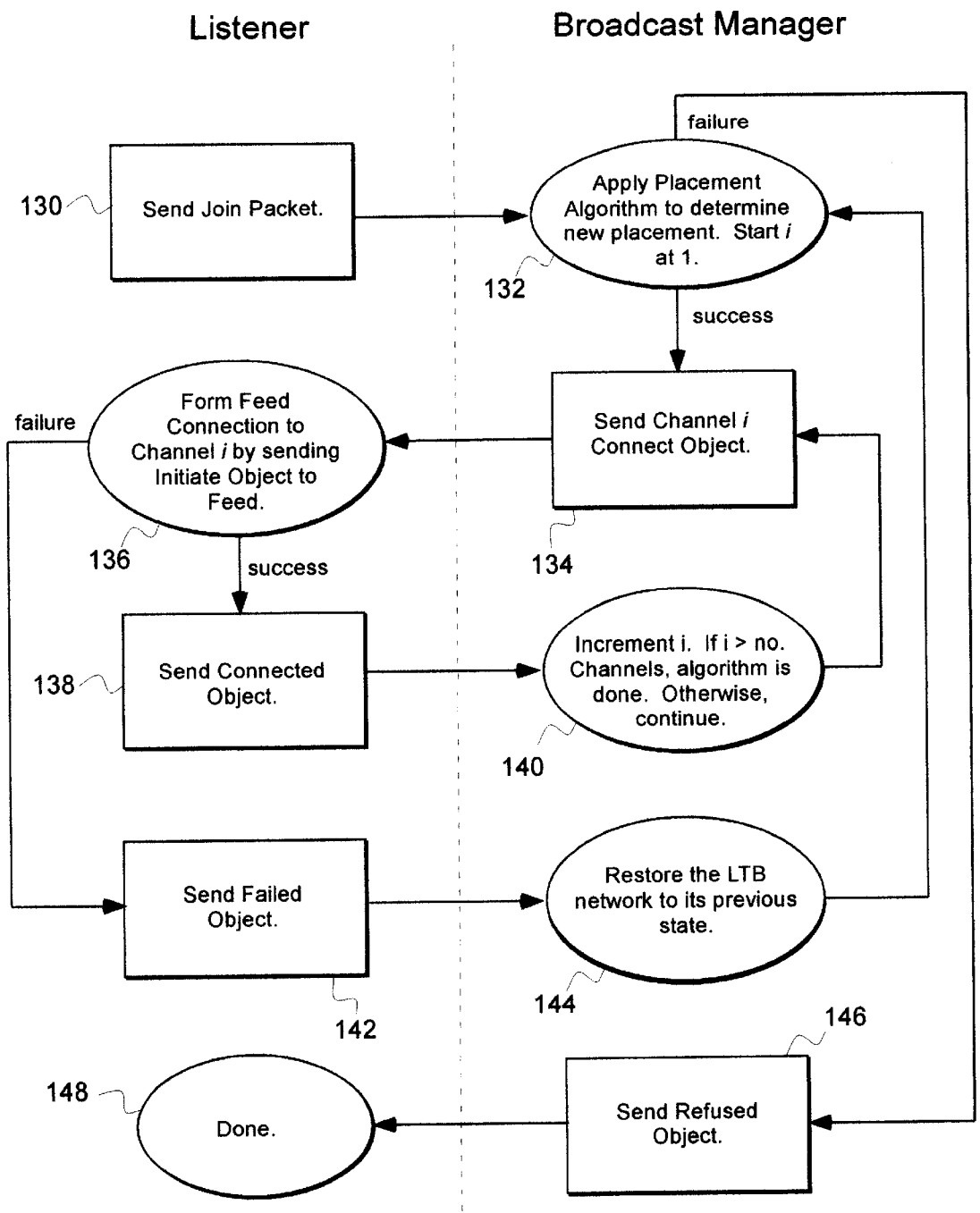
FIG. 6 shows the steps by which a prospective Listener joins an LTB broadcast.

FIG. 6—Joining an LTB Broadcast

Figure 19:
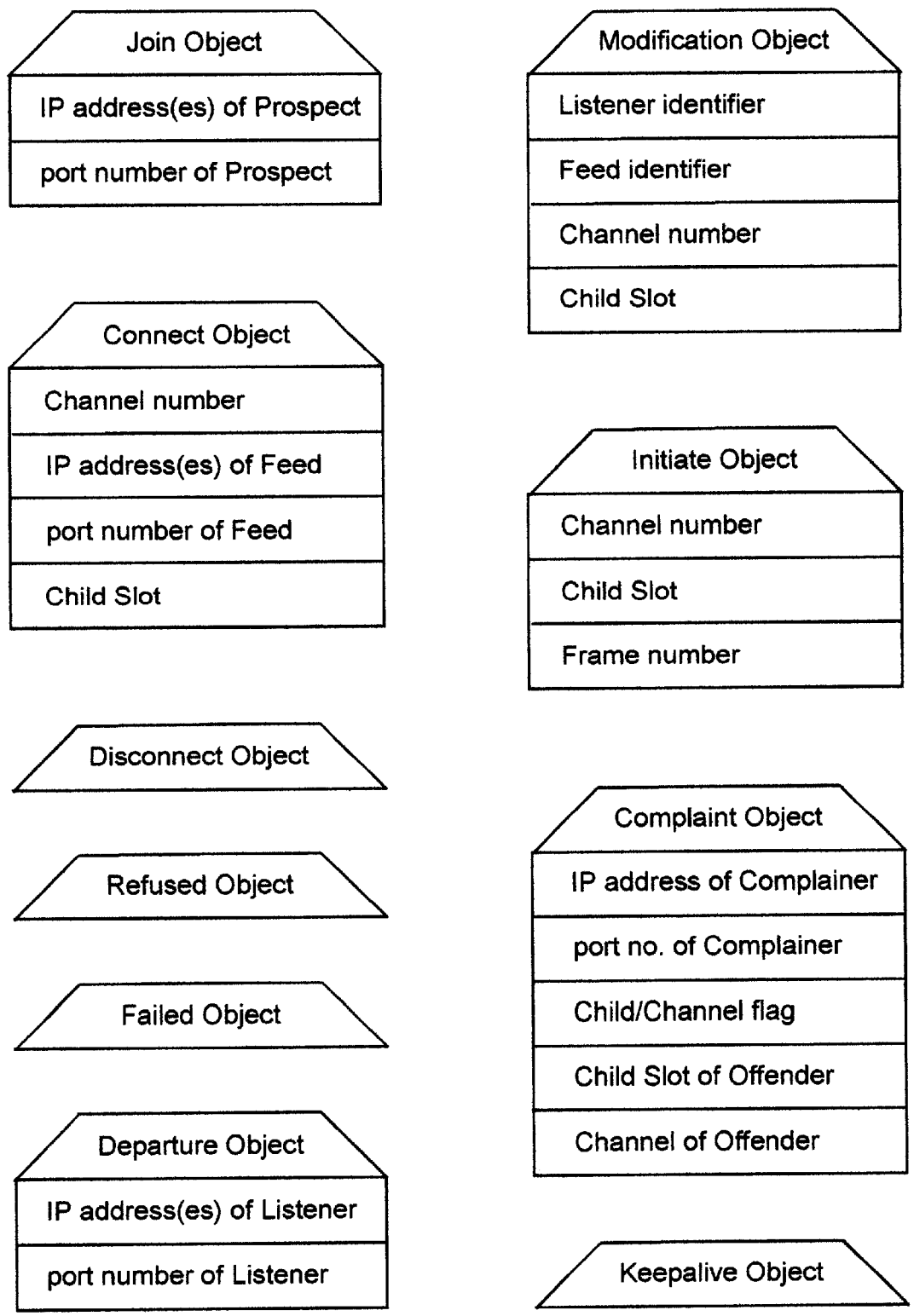
FIG. 19 shows the components of several defined objects.

FIG. 6 illustrates the interactions between a prospective new Listener (called a Prospect) and the Broadcast Manager. In step 130, the Prospect connects to the Broadcast Manager, which is at a known IP address and port number. The Prospect sends an object, called a Join Object, as shown in FIG. 19. The Join Object indicates the Prospect's IP address (or addresses, if more than one) and port number.

At step 132, in response to the Join Object, the Broadcast Manager applies the Placement Algorithm to determine where to place the Prospect within each Channel's Tree. The Placement Algorithm rearranges the LTB network, producing a set of instructions, called Modification Objects, for modifying the existing LTB network to accommodate the Prospect. A Modification Object is illustrated in FIG. 19. There will always be one Modification Object for each Channel of the Prospect. The Prospect's Modification Objects are processed in the manner described here. The other Modification Objects are processed in the manner described by the flowchart of FIG. 7.

For each Channel i, there is a Modification Object, here called Mi, such that Mi's Listener identifier is the Prospect, and Mi's Channel number is i. Mi's Feed identifier is referred to as Fi, and Mi's Child Slot is referred to as Si. Fi is to be the Prospect's Feed, with the Feed Connection coming from Fi's Child Slot Si.

In the preferred embodiment, the Placement Algorithm for a given Tree consists of identifying the shallowest Listener L to which the Prospect can be attached. In the case of a multi-Channel LTB network, this might necessitate displacing a leaf Listener. The result of this algorithm is a Tree of minimum depth, called a balanced Tree. For the single-Channel embodiment illustrated in FIG. 3, there is a single binary Tree. In this case, the Prospect is attached to any Listener with an unused Child Slot, i.e., any Listener with fewer than 2 Children. Therefore, the shallowest such Listener F is selected to be the Prospect's Feed, using any unused Child Slot of F's. An arbitrary candidate for F is chosen if there is more than one. In the single-Channel embodiment, the Placement Algorithm produces only a single Modification Object when adding a new Listener.

A sequence of steps is now performed once for each Channel i, starting with i equal to 1. At step 134, the Broadcast Manager sends an object, called a Connect Object, to the Prospect. The contents of a Connect Object are shown in FIG. 19. A Connect Object instructs a Listener to form a new Feed Connection to some Feed, the Feed in this case being Fi. The object contains the Channel number which the Feed Connection is for (in this case i), the IP address (or addresses) and port number of Fi, and which Child Slot of Fi's to use, in this case Si.

At step 136, in response to a Connect Object, the Prospect attempts to initiate a Feed Connection. To do this, she sends an object, called an Initiate Object, to F. This object is sent to the IP address and port number indicated in the Connect Object. The format of an Initiate Object is shown in FIG. 19. The object includes the Channel number and Child Slot number indicated in the Connect Object. It also includes the Frame number at which transmission should begin. In the case of a Prospect, a negative Frame Number indicates that transmission should start at the next available Frame number. This step is illustrated in more detail in FIG. 7.

If multiple IP addresses were indicated, then each is tried, until the first one which is successful. If the Prospect fails to connect to F at any IP address, then the Prospect continues with step 142, as described later. Otherwise, if the Feed Connection is successfully established, then the Prospect continues with step 138. She sends an object, called a Connected Object, as illustrated in FIG. 19, to the Broadcast Manager. This object has no fields. Upon receiving the Connected Object, at step 140, the Broadcast Manager increments i. If i is greater than the number of Channels, then the join process is complete, and the Prospect has become a Listener. Otherwise, the Broadcast Manager continues with step 134, processing the next Channel.

In response to a successful connection, F performs a Clean Disconnection of any existing Feed Connection on the indicated Child Slot, replacing it with the new Feed Connection, and proceeding to transmit the appropriate Channel over the Feed Connection in the usual manner. A Clean Disconnection is the way a Listener or Originator purposefully disconnects a Feed Connection, so that the other end of the connection knows the disconnection is not inadvertent, and so doesn't report the disconnection to the Broadcast Manager as a Fault. A Clean Disconnection consists of first sending a Disconnect Object to the other end of the connection, then disconnecting it. A Disconnect Object, as illustrated in FIG. 19, has no contents. When a Listener or Originator receives a Disconnect Object, it suppresses any Fault notification for that Feed Connection when it is disconnected.

If any attempts at forming Feed Connections failed, the Prospect continues at step 142. Here, the Prospect sends a Failed Object to the Broadcast Manager, as illustrated in FIG. 19. In response to this object, at step 144, the Broadcast Manager restores the LTB network to its previous state before step 130, sending the necessary Connect Objects to Listeners. The Broadcast Manager then proceeds with step 132, this time finding a new placement for the Prospect.

If there are no other placements available, the Broadcast Manager proceeds with step 146, sending an object, called a Refused Object, as illustrated in FIG. 19, to the Prospect. This object has no fields. It informs the Prospect that its request to join the LTB broadcast has been rejected. At step 148, the Prospect has completed the join process, in failure. In the preferred embodiment, no additional placement attempts are made. Thus, in the preferred embodiment, the Broadcast Manager always proceeds from step 144 to step 146.

Figure 7:
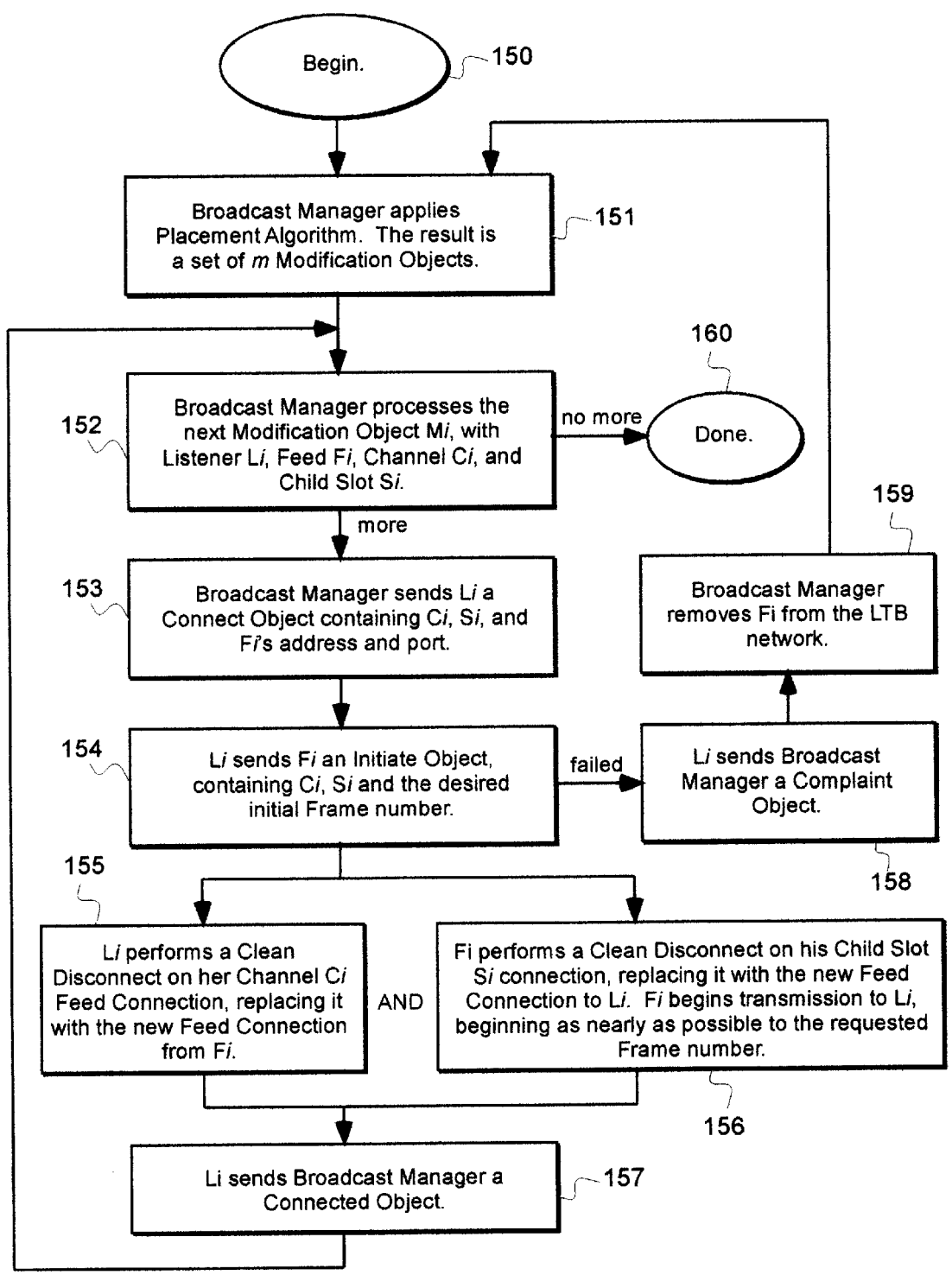
FIG. 7 shows the steps by which a Feed Connection is established.

FIG. 7—Modifying the LTB Network

FIG. 7 illustrates the steps by which a modification to the LTB network is made. The process begins at step 150, with some external stimulus. The stimulus can be a Join Object from a prospective new Listener, or a Complaint Object requiring a Fault to be repaired, or a Departure Object notifying the Broadcast Manager of a departing Listener.

At step 151, the Broadcast Manager applies the Placement Algorithm to compute a new LTB network configuration. The Placement Algorithm ensures that each Listener receives each Channel once. In the preferred embodiment, it also ensures that each Tree remains balanced. The result of the Placement Algorithm is some number of Modification Objects, as illustrated in FIG. 19. Each Modification Object is an instruction to a single Listener to form a new Feed Connection. A loop is then entered in which each Modification Object is processed.

At step 152, the next Modification Object is processed. This object is referred to here as Mi. The Listener identification component of the object is referred to here as Li. The Feed identification component is referred to here as Fi. The Channel number component is referred to here as Ci. The Child Slot component is referred to here as Si.

At step 153, the Broadcast Manager sends a Connect Object (as illustrated in FIG. 19) to Listener Li. The Channel number component of this object is set to Ci. The IP address and port number components are set to those of Listener Fi. The Child Slot component is set to Si.

At step 154, in response to the Connect Object, Li sends Fi an Initiate Object (as illustrated in FIG. 19). The Channel number component of this object is set to Ci. The Child Slot component is set to Si. The initial Frame number component is set to one past the Frame number of the Frame most recently received by Li.

If Li fails to transmit the Initiate Object to Fi, then at step 158, Li sends a Complaint Object to the Broadcast Manager (as illustrated in FIG. 19). The Complainer IP address and port number components of the object are set to those of Li. The Child/Channel flag and Channel components are set to identify Li. In response to the Complaint Object, at step 159, the Broadcast Manager disconnects Fi from the LTB network, continuing with step 151, where the Placement Algorithm is once again performed.

If Li succeeds in transmitting the Initiate Object to Fi, then Li continues at step 155, performing a Clean Disconnect (as described earlier) on her Channel Ci Feed Connection, and replacing it with the new Feed Connection to Li. While Li performs step 155, Fi simultaneously performs step 156. Fi likewise does a Clean Disconnect on his Child Slot Si connection, replacing it with the new connection from Li. Fi then proceeds to begin transmission of Channel Ci to Li, starting as nearly as possible with the Frame number identified in the Initiate Object. If it is earlier than the earliest Frame stored in Fi's anti-jitter buffer, then transmission begins with the earliest Frame in the anti-jitter buffer. If the requested Frame is greater than the most recently-received Frame, then transmission is suppressed until the requested Frame number arrives. If a negative Frame number was specified, then transmission begins with the next Frame which Fi receives on that Channel.

After Li completes step 155, she continues with step 157, sending the Broadcast Manager a Connected Object (illustrated in FIG. 19). In response to the Connected Object, the Broadcast Manager continues with step 152, processing the next remaining Modification Object. If there are no more Modification Objects, the process is completed at step 160.

Figure 8:
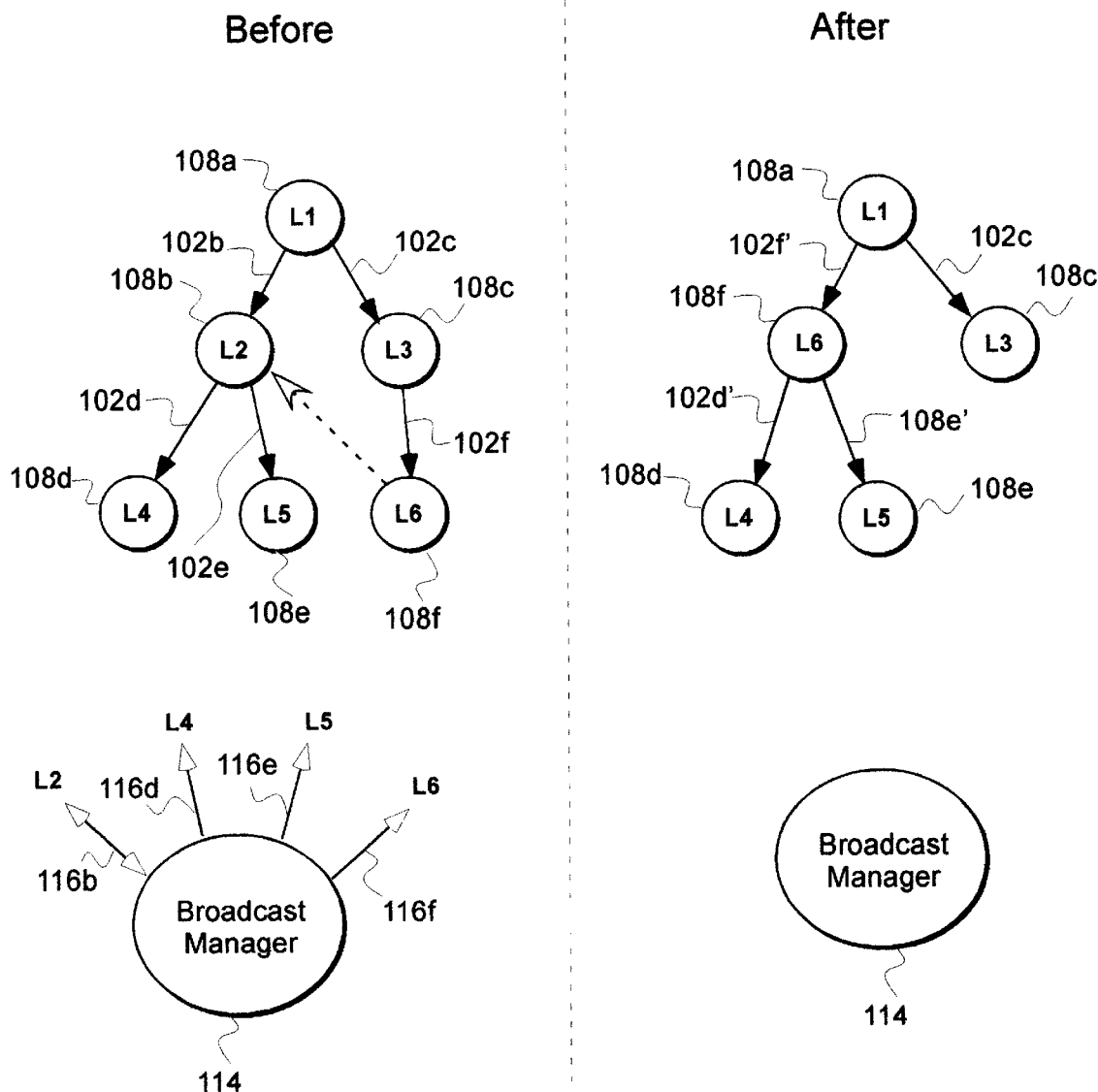
FIG. 8 shows an LTB network before and after a Listener is removed.

FIG. 8—Leaving an LTB Broadcast

FIG. 8 illustrates a portion of an LTB network before and after a Listener leaves. A single-Channel LTB network is shown. The same procedure is applied to each Tree in a multi-Channel LTB network.

Suppose some Listener D is leaving the LTB network. This can be the result of an action initiated by D, or an action initiated by the Broadcast Manager in response to a Complaint Object. The basic algorithm is that the Broadcast Manager chooses the most-recently-added Listener R as the replacement for D, moving R to fill D's place, and sending out the necessary instructions. The Placement Algorithm for a departing Listener consists of two parts. First, each Tree is restored to its state before R was added. Second, in each Tree, D is removed, and R is put in its place. The result is a set of Modification Objects (illustrated in FIG. 19), which are then implemented as illustrated by the flowchart of FIG. 7.

In FIG. 8, on the Before side, Listener 108b (L2) is the departing Listener. L2 sends a Departure Object, illustrated in FIG. 19, over Control Connection 116b to Broadcast Manager 114. The Departure Object contains the departing Listener's IP address or addresses, and port number, as originally sent in a Join Object, in order to identify the departing Listener.

Upon receiving a Departure Object, the Broadcast Manager applies the Placement Algorithm to remove the departing Listener from its internal pattern of interconnections. Listener 108f (L6) is the most recently added Listener. Therefore, L6 is chosen to be the replacement for the departing L2. First, the Tree is restored to its state before L6 was added. Since L6 is a Leaf, it is simply disconnected from its parent, Listener 108c (L3). Next, the departing Listener L2 is removed, and the replacement Listener L6 is put in its place. The result is three Modification Objects. The first has L6 as the Listener, Listener 108a (L1) as the Feed, and Child Slot 1 as the Child Slot (the same Child Slot previously used by L2). The second has Listener 108d (L4) as the Listener, L6 as the Feed, and Child Slot 1 as the Child Slot (the same Child Slot previously used on L2). The third has Listener 108e (L5) as the Listener, L6 as the Feed, and Child Slot 2 as the Child Slot (the same Child Slot previously). All have Channel 1 as the Channel. The Modification Object instructions are then carried out as per the flowchart illustrated in FIG. 7.

The After side of FIG. 8 illustrates the arrangement of the LTB network after L2 has departed, and after the new Feed Connections have been established. The Broadcast Manager once again has no active connections. L3 no longer has a Child. L1's Child Slot 1 Child has changed from L2 to L6. Listeners L4 and L5 now have L6 as their Feed in place of L2. Feed Connections 102b, 102d, 102e and 102f have been disconnected with Clean Disconnects. New Feed Connections 102d', 102e' and 102f' have been established in place of 102d, 102e and 102b, respectively. Feed Connection 102c remains unchanged. In general, with a large number of Listeners, all but a small number of Feed Connections in an LTB network remain unchanged when a Listener departs.

Alternative Methods of Control

In the preferred embodiment, Connect Objects are sent directly from the Broadcast Manager to the Listener being instructed to form a new connection, here called the instructee. In another embodiment, Connect Objects are forwarded to the instructee through one or more other Listeners, with the purpose of minimizing data traffic to the Broadcast Manager. When a Listener leaves the LTB network, the Broadcast Manager returns a list of Connect Objects for Children of the Listener, and for Children of those Children, and so on. Before the Listener leaves, he forwards these Connect Objects to his Children, over the existing Feed Connections. These Children in turn may forward some Connect Objects to their Children, and so on. In this embodiment, the Connect Object additional fields to identify the intended recipient of the Connect Object. The advantage of this embodiment is that the Connect Objects are efficiently sent over existing connections, while network traffic going to and from the Broadcast Manager is reduced.

In another embodiment, Connect Objects are sent to the Listener who will be transmitting over the resulting Feed Connection, rather than the Listener who will be receiving over the resulting connection.

Figure 9:
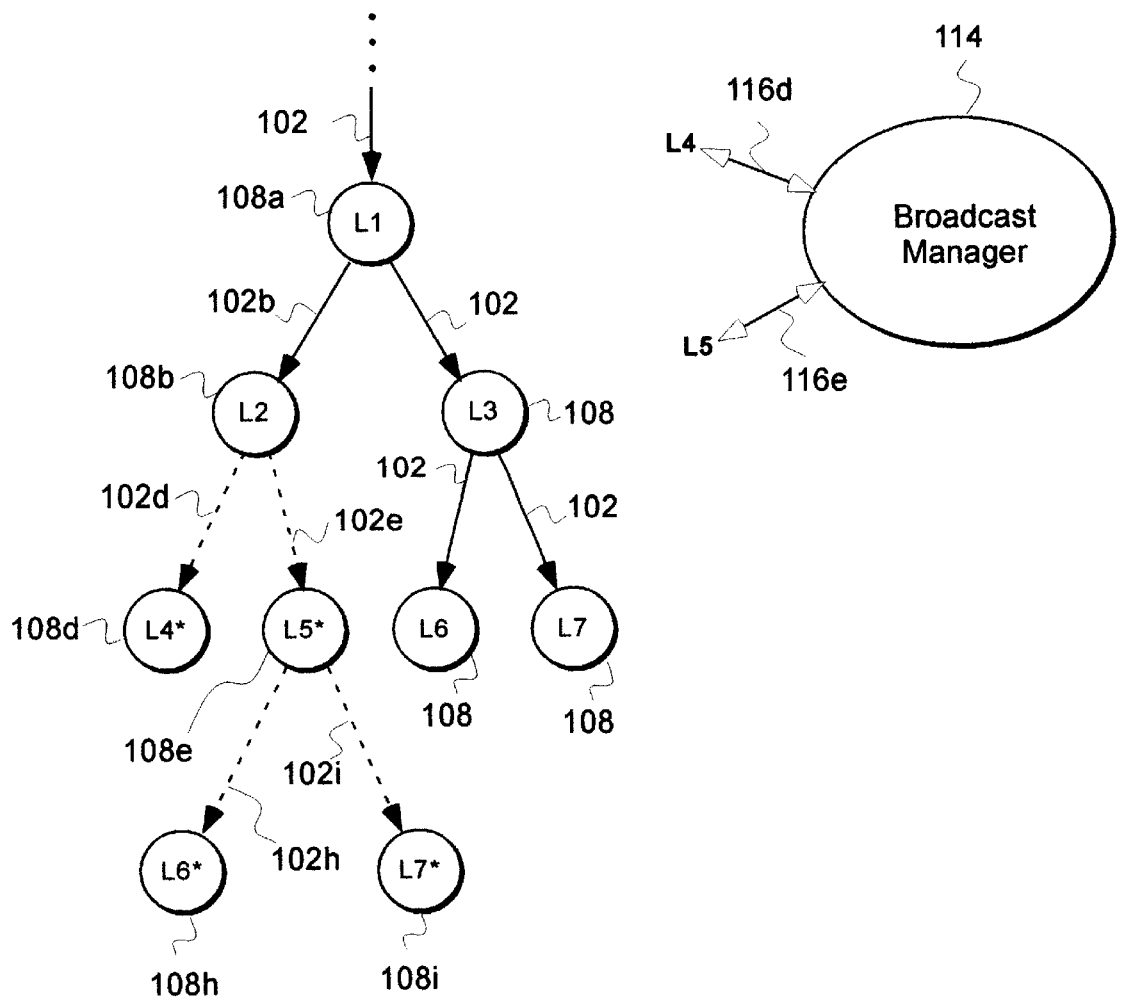
FIG. 9 shows an LTB with a non-performing Listener.

FIG. 9—Detecting a Non-performing Listener

FIG. 9 illustrates a portion of an LTB network with a Listener which is failing to retransmit the broadcast. Listeners 108 are receiving and transmitting normally over connections 102. Listener 108b (L2) is receiving Frames from her Feed, Listener 108a (L1). However, she is failing to retransmit any Frames to her Children 108d (L4) and 108e (L5). This could be due to any number of reasons, such as network congestion, or a network failure somewhere between L2 and L1, and/or between L2 and L4 and L5. Alternatively, L2 may have ceased running.

In order that Children L4 and L5 can detect L2's failure to retransmit, the present invention makes use of a keepalive signal, as commonly practiced. In the event that a Listener fails to receive any transmission over its Feed Connection for a certain period of time (called the Keepalive Timeout Interval), a Fault is considered to have occurred. In the preferred embodiment of a non-redundant LTB network (for example, a single-Channel LTB network), the Keepalive Timeout Interval is 15 seconds. In the preferred embodiment of a redundant LTB network (as described later), the Keepalive Timeout Interval is 1 minute. In order to prevent the Keepalive Timeout Interval from expiring for his Children, a Listener sends Keepalive Objects (illustrated in FIG. 19) to his Children over their Feed Connections. If, after a certain period of time called the Keepalive Send Interval, a Listener has not sent anything to a given Child, the Listener sends that Child a Keepalive Object. The Keepalive Send Interval must be less than the Keepalive Timeout Interval. In the preferred embodiment, the Keepalive Send Interval is 10 seconds. The Keepalive Object indicates to the Child that there is no Fault from that Feed.

In FIG. 9, L5 fails to receive anything over his Feed Connection 102e for the Keepalive Send Interval of 10 seconds. As a result, he has failed to send anything to his Children 108h (L6) and 108i (L7). Therefore, he sends them each a Keepalive Object. After another 5 seconds, receiving nothing from his Feed L2, L5's Keepalive Timeout Interval expires. This is considered to be a communication failure in the LTB network, called a Fault. L5 sends a complaint notification object (called a Complaint Object) to Broadcast Manager 114 over intermittent connection 116e, to notify it of the Fault. The Listener (or Originator) sending a Complaint Object is called the Complainer. A Complaint Object identifies the Complainer with his fP address and port number. It identifies another Listener (or Originator), called the Offender, as being the source of a communication failure. The Offender is identified by the Channel Slot or Child Slot to which it is connected. The Child/Channel component indicates whether the Offender is a Feed or a Child. The Channel Slot or Child Slot is set accordingly, to identify the Offender. In this case, L5 is the Complainer, with L2 as the Offender. L4, after 15 seconds of failing to receive anything over its Feed Connection 102d, also sends a Complaint Object, likewise naming L2 as the Offender. L4 sends the Complaint Object over Control Connection 116d to the Broadcast Manager.

When the Broadcast Manager receives a Complaint Object, it must apply a corrective action to restore the LTB network's integrity. In the present embodiment, if the Offender is a Listener, the Broadcast Manager removes it from the LTB network, in the manner described previously. In this case, the Offender is L2. If the Offender is the Originator, then in the preferred embodiment, the Complainer is removed instead. This strategy tends to work reasonably well. In the above example, suppose L5 were the one experiencing a network connection problem, rather than L2. In this case, L5 will have difficulty connecting to the Broadcast Manager to send a Complaint Object. Instead, one or both of L5's Children, L6 and L7, will be likely to send their Complaint Objects first. In this case, L5 would be removed from the LTB network, rather than L2.

Figure 10:
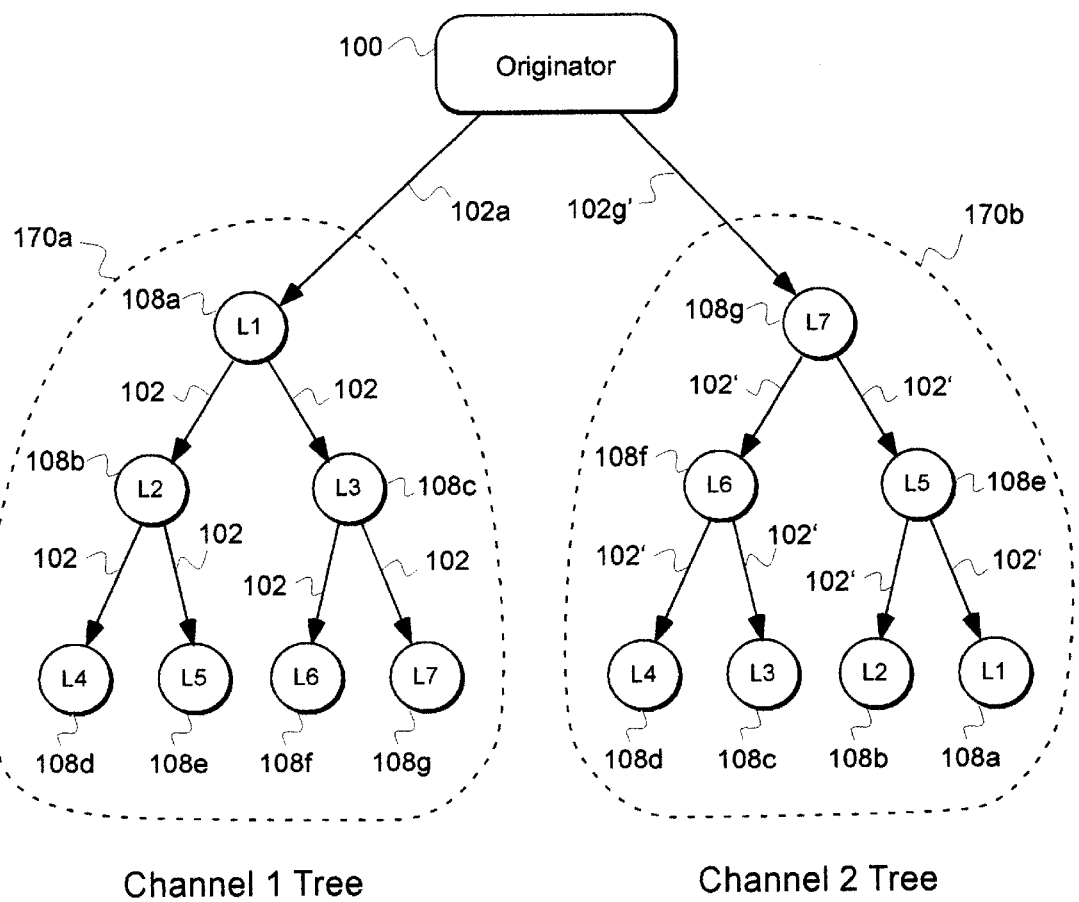
FIG. 10 shows a 2-channel LTB network with a Fanout of 2, called a Balanced 2-Channel LTB, as an example of a Balanced LTB.

FIG. 10—Balanced LTB Network

FIG. 10 illustrates another embodiment of the present invention, employing what will be referred to as a Balanced LTB network. In the single-Channel embodiment illustrated by FIG. 3, half of the Listeners are required to retransmit two copies of each incoming Frame, while the other half are not required to retransmit anything. Such an LTB network is referred to as Unbalanced, because some Listeners are required to transmit more Frames than they receive. Referring to FIG. 4, a Balanced LTB network is one where Listeners have the same number of Child Slots 202 as there are Channels.

Suppose a broadcast is to be transmitted at 32 kbps. With the single-Channel embodiment, Listeners must be able to receive at 32 kbps, and transmit at 64 kbps. Most Internet users today have phone modem connections limited to 56 kbps or less. These users would be unable to join the single-Channel embodiment broadcast. If a Balanced LTB network is used, Listeners must transmit and receive at 32 kbps. Many Internet users with phone modem connections would be able to join such a broadcast. So, the use of a Balanced LTB network maximizes the number of users who can join an LTB broadcast at a given broadcast bandwidth.

FIG. 10 illustrates a 2-Channel Balanced LTB network. The Frames are divided evenly between two Channels—the even-numbered Frames going to Channel 1, and the odd-numbered Frames going to Channel 2. Each Channel is disseminated across its own Tree. Each Listener occupies one Node in each Tree.

Originator 100 formats the Data Stream into sequentially numbered Frames. The Frame number is sent along with each Frame, to allow the original Frame sequence to be reconstructed. In the preferred embodiment, the Frame number is sent in a fixed number of bits. Enough bits are used to represent the Frame number so that the Frame number wraps around infrequently (in the preferred embodiment, no more than once every ten minutes). Every even-numbered Frame is broadcast on Tree 170a, called the Channel 1 Tree. Every odd-numbered Frame is broadcast on Tree 170b, called the Channel 2 Tree. The total number of Children a given Listener may have in both Trees must not exceed 2. In general, with an n-Channel Balanced LTB network, the total number of a given Listener's Children in all Trees must not exceed n.

Frames broadcast on the Channel 1 Tree are sent over Feed Connection 102a to Listener 108a (L1). From there, they are distributed in the normal manner over connections 102 to L1's Children 108b and 108c, and so on, until they have been distributed to every Listener 108a–g. Frames broadcast on the Channel 2 Tree are sent over Feed Connection 102g' to Listener 108g (L7). From there, they are distributed in the normal manner over connection 102' to L7's Children 108f and 108e, and so on, until they have been distributed to every Listener.

Each Listener 108 is connected to two Feed Listeners, one for each Channel. For example, Listener 108f (L6) has Listener 108c (L3) as its Channel 1 Feed, and Listener 108g (L7) as its Channel 2 Feed. Frames coming from the two Feeds are merged and sorted, to reconstruct the original sequential frame sequence which the Originator sent out. Referring momentarily to FIG. 4, Frames arriving at Channel Slots C1 and C2 are merged and fed into anti-jitter buffer 208, where they are sorted.

Referring back to FIG. 10, each Listener 108 is connected to two or fewer Children. For example, Listener 108b (L2) is connected to Listeners 108d (L4) and 108e (L5), both on Channel 1. Recall that Channel 1 is associated with the even-numbered Frames. Therefore, when L2 receives an even-numbered Frame, he replicates it, and retransmits it to L4 and L5. When L2 receives an odd-numbered Frame, he does not replicate and transmit it. It can be seen, then, that L2 requires a transmission bandwidth equal to his reception bandwidth. This is characteristic of all Balanced LTB networks.

Note that while most Listeners will have n total Children (summed between all the Trees) in a Balanced n-Channel LTB network, a small number will have fewer than n Children. In FIG. 10, Listener 108d (L4) has no Children in either Tree. Also note that it is possible for a Listener to have Children on different Channels, even though in the above example, Listeners' Children are always on the same Channel. In the preferred embodiment, Listeners always have Child Slots assigned to Channels in pairs. Thus, in the preferred embodiment of a 2-Channel LTB, Listeners would never have Children on different Channels.

Figure 11A:
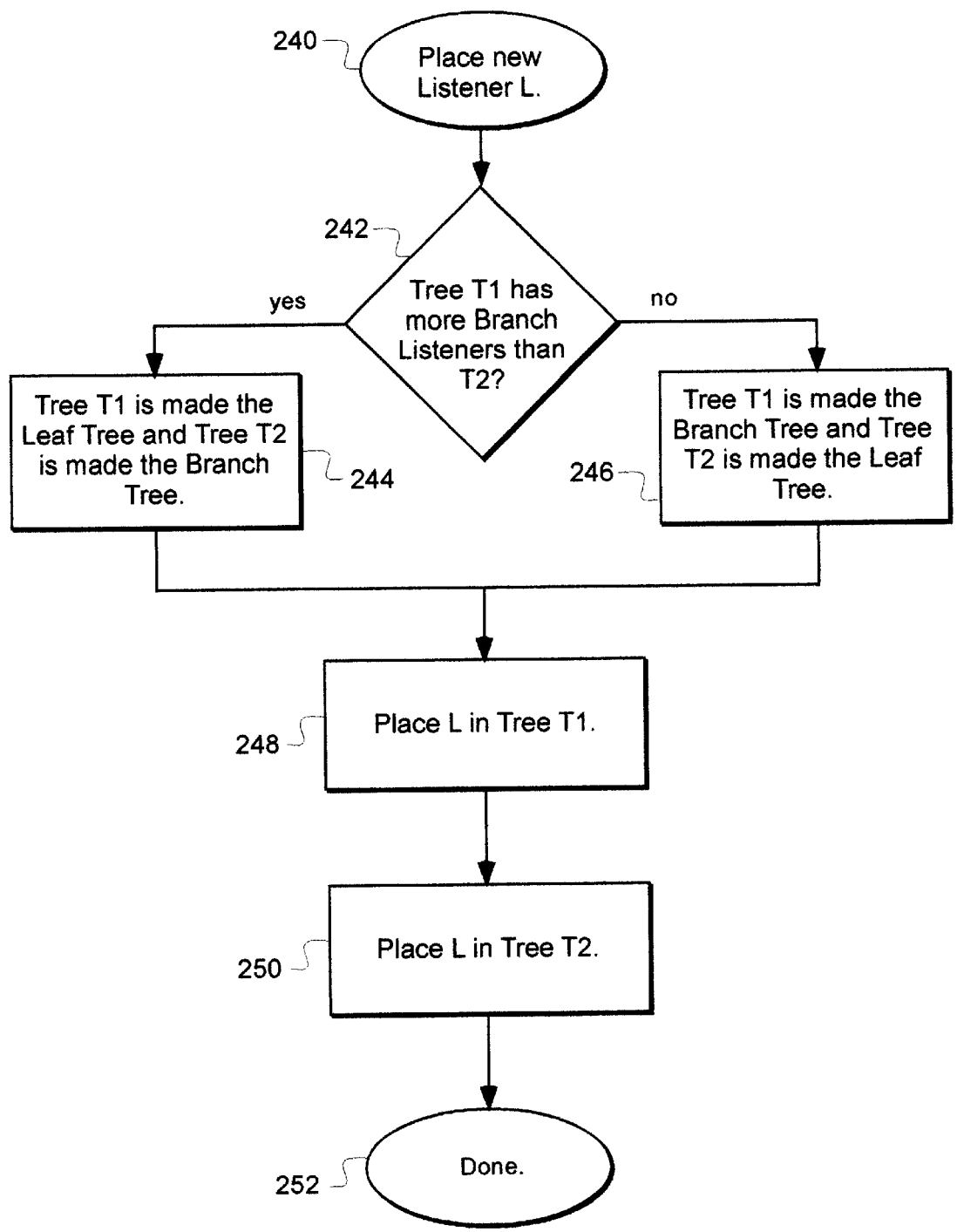
FIG. 11a is a flowchart of the Placement Algorithm for a 2-Channel LTB.
Figure 11B:
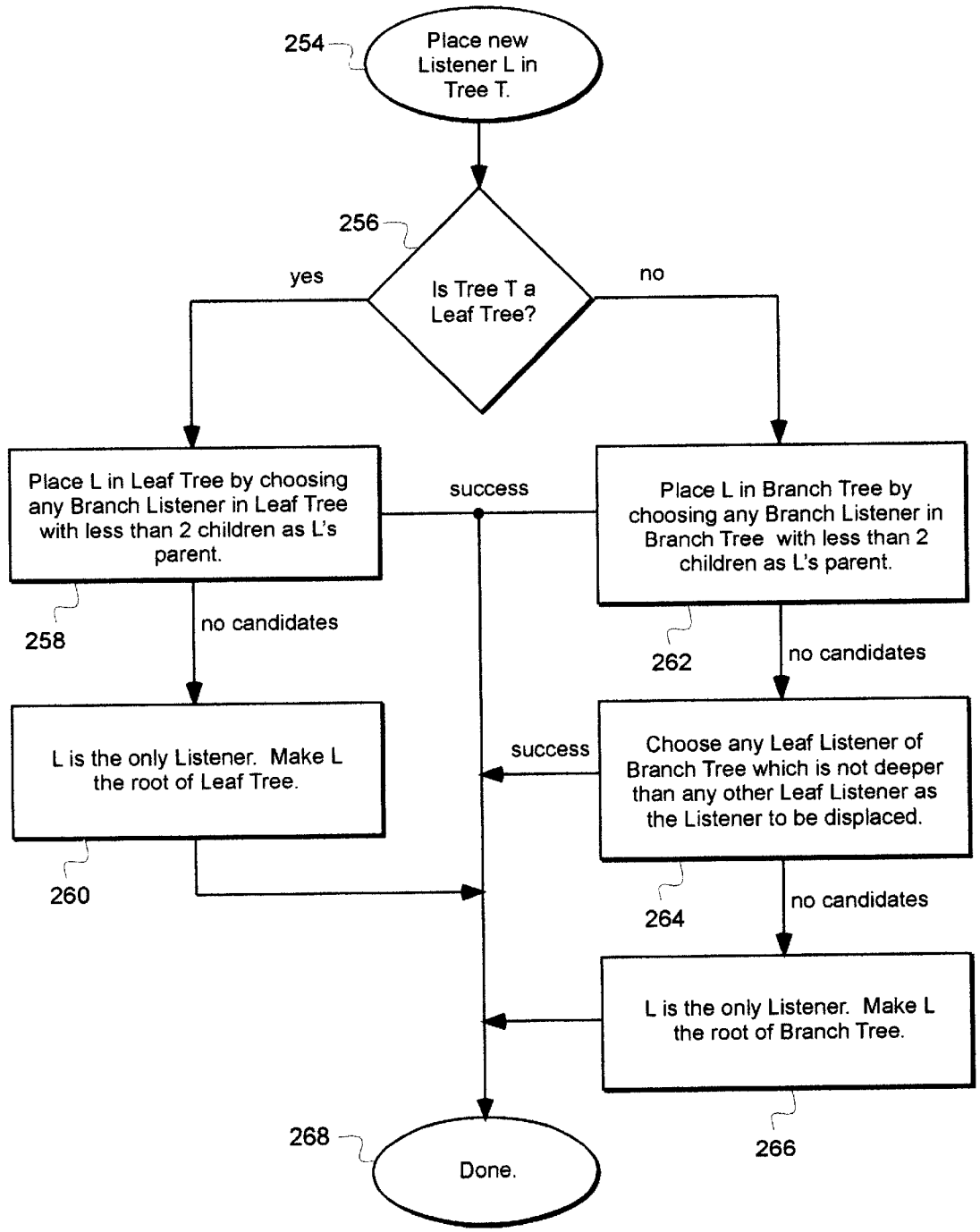
FIG. 11b is a flowchart of the general algorithm for placing a new Listener in a given Tree in a multi-Channel LTB.

FIGS. 11a and 11b—Placement Algorithm for 2-Channel LTB Network

In the case of a Balanced 2-Channel LTB network, the Placement Algorithm has the task of assigning each new Listener a place in two different binary Trees, one for each Channel. There is great flexibility in the specific operation of the Placement Algorithm. Design goals for the preferred embodiment include the reduction of the number of changes to Feed Connections required, and the minimization of the depth of the resulting Trees. Other Placement Algorithms address additional design goals. For example, it is desirable to minimize the overall network traffic, keeping Feed Connections as local as possible. The Placement Algorithm can achieve this by matching up Listeners who are on the same sub-net (as indicated by the first 3 bytes of their IP address). This will sometimes require re-grouping multiple Listeners when a new Listener joins, or an existing Listener departs.

In the preferred embodiment for a 2-Channel LTB network, the Placement Algorithm works much the same way as described previously for a 1-Channel LTB network. As before, a new Listener is placed in the shallowest suitable location within each Tree, so that the Tree remains balanced. The only new restriction is that if a node is retransmitting to one or more Listeners (i.e. it is a non-leaf) in one Tree, then it must not retransmit to any Listeners (i.e. it must be a leaf) in the other Tree. It is permitted for the new Listener to be a leaf in both Trees. To clarify this algorithm, it will be helpful to define some new terms.

As stated, each Listener is assigned to be a leaf in one Tree, and is permitted to be a non-leaf in the other Tree. The Tree in which the Listener must be a leaf is called that Listener's Leaf Tree. The Tree in which the Listener is permitted to be a non-leaf is called that Listener's Branch Tree. Listeners which have a given Tree as their Leaf Tree are called Leaf Listeners of that Tree. Listeners which have a given Tree as their Branch Tree are called Branch Listeners of that Tree. Note that while a Tree's Branch Listeners can be leaves, its Branch Leaves must always be leaves.

Based on well known properties of balanced binary trees in general, it can be seen that the number of non-leaves in a balanced binary Tree is always equal to floor(N/2), where N is the number of Listeners in the Tree, and the floor function produces the greatest integer less than or equal to its argument. Since only Branch Listeners can be non-leaves, the number of Branch Listeners must be at least floor(N/2). Therefore, when a new Listener is placed, the Placement Algorithm arbitrarily assigns either Tree as the Listener's Branch Tree, so long as the resulting number of Branch Listeners in each Tree is at least floor(N/2), where N includes the new Listener. This restriction is satisfied as long as the Tree with fewer Branch Listeners is always selected as each new Listener's Branch Tree. The other Tree is assigned as the new Listener's Leaf Tree.

It can further be seen that in order to satisfy the restriction that each Tree remain balanced, the Placement Algorithm must not allow a Branch Listener to be deeper in the Tree than any Leaf Listener. The Placement Algorithm for a new Listener can be restated as follows, using the above-defined terminology:

1) The new Listener is made a Leaf Listener in one Tree, and a Branch Listener in the other, so that the number of Branch Listeners in one Tree is never more than one greater than the number of Branch Listeners in the other Tree.
2) The new Listener is placed in each Tree so that no Branch Listener of that Tree has more than 2 Children in that Tree.
3) The new Listener is placed in each Tree so that no Leaf Listener of that Tree has any Children in that Tree.
4) In a given Tree, a new Branch Listener is never placed at a deeper level than any Leaf Listener.

FIG. 11a illustrates step 1) of the above process. At step 240, the Placement Algorithm is given a new Listener L to be placed in both Trees, T1 and T2, of a 2-Channel LTB network. At step 242, it is determined whether Tree T1 has more Branch Listeners than T2. If so, at step 244, Tree T1 is made the Leaf Tree, while Tree T2 is made the Branch Tree. Otherwise, at step 246, Tree T1 is made the Branch Tree, while Tree T2 is made the Leaf Tree. At step 248, L is placed in Tree T1, according to the flowchart of FIG. 11b. At step 250, L is placed in Tree T2, according to the flowchart of FIG. 11b. At step 252, the Placement Algorithm is finished.

FIG. 11b illustrates steps 2) through 4) of the above process. At step 254, the Placement Algorithm is given new Listener L to be placed in Tree T. At step 256, the Tree type is examined. If it is L's Leaf Tree, then at step 258, a place is found for L in the Tree by choosing any arbitrary Branch Listener with fewer than 2 Children to be L's parent. If there are no such Branch Listeners, then it is guaranteed that there are no other Listeners. In this case, at step 260, L is placed in the root position. Being in the root position, L's Feed Connection for the Leaf Tree is formed directly from the Originator.

If T is L's Branch Tree, then at step 262, a place is found for L in the Branch Tree by choosing any arbitrary Branch Listener with fewer than 2 Children to be L's parent, as at step 258. If there are no such Branch Listeners, then at step 264, any Leaf Listener which is not deeper in the Tree than any other Leaf Listener is chosen to be displaced. Call the Listener chosen to be displaced D. Listener L then takes D's place within the Tree, D being made a child of L. If there are no suitable Branch or Leaf Listeners, then it is guaranteed that there are no other Listeners. In this case, at step 266, L is placed in the root position, as at step 260. Being in the root position, L's Feed Connection for the Branch Tree is formed directly from the Originator.

It can be seen by one skilled in that art, given that the Trees remain balanced, that the maximum number of transmission steps between the Originator and any Listener, for any Channel, is the same as the maximum number of steps for the single-Channel embodiment of FIG. 3, and is given by:

$$1+\text{floor}[\log_2(N)]$$

where N is the number of Listeners.

Removing a Listener From a Multi-channel LTB Network

When removing a Listener from any multi-Channel LTB network, the same procedure described earlier, and illustrated by FIG. 8, is used, being applied individually to each Tree.

Figure 12:
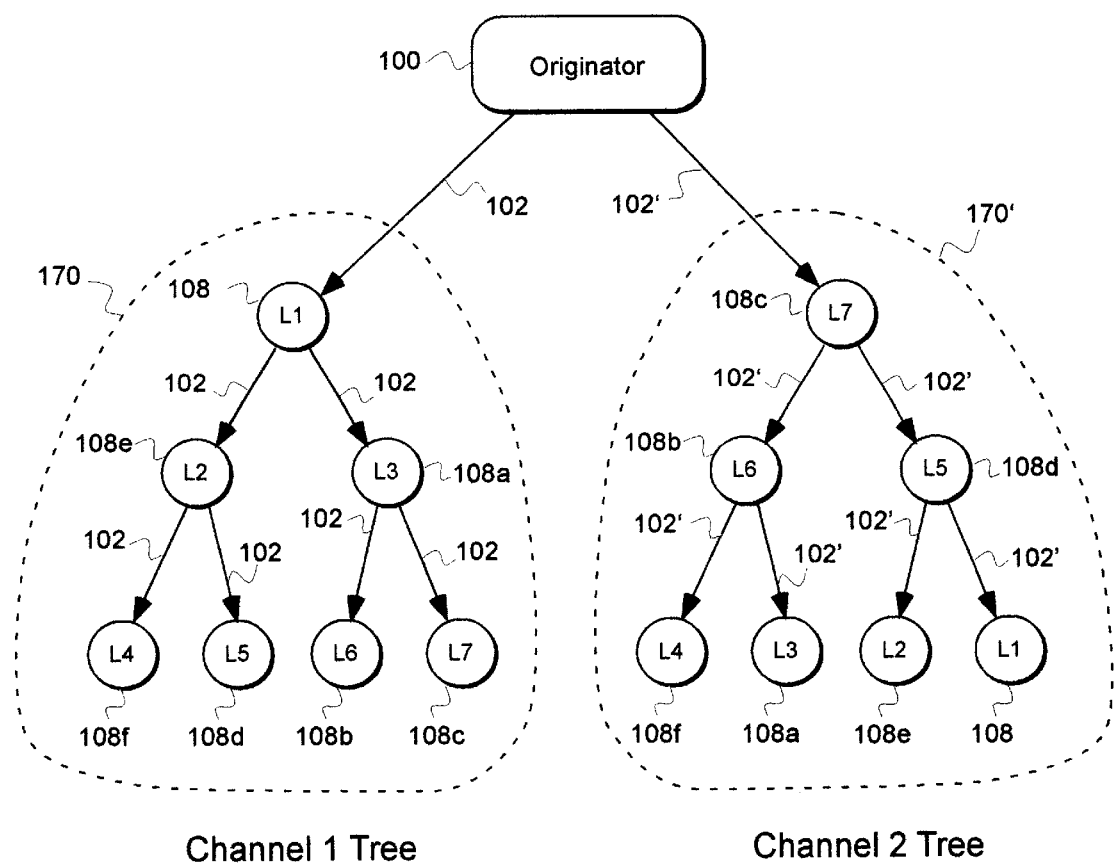
FIG. 12 shows a Balanced 2-channel LTB with 2×redundancy, called a 2×Redundant LTB, as an example of a Redundant LTB.

FIG. 12—Redundant LTB Network

FIG. 12 illustrates a Balanced 2-Channel LTB network with 2 fold redundancy. Originator 100 sends each Frame twice; first on the Channel 1 Tree 170, along Feed Connections 102, and then again on the Channel 2 Tree 170', along Feed Connections 102'. Hence, in normal operation, each Listener 108 receives each Frame twice; once from her Channel 1 Feed Connection 102, and once from her Channel 2 Feed Connection 102'. The first copy of a given Frame to arrive (identifiable by its sequence number) is replicated and retransmitted to all Children. The second copy to arrive is simply discarded.

The purpose of adding redundancy is to provide for increased reliability. For example, suppose Listener 108a (L3) temporarily stops retransmitting. L3 has Children 108b (L6) and 108c (L7) in the Channel 1 Tree. If a non-redundant LTB network were used, then reception by L6 and L7 would be effectively stopped as long as L3 was not retransmitting, since every other Frame would never arrive. However, with the present embodiment, Listeners receive the same Frame from two different Feeds. Generally, the two Feeds are different Listeners. L6's second Feed is L7, while L7's second Feed is the Originator. Therefore, even though no Frames arrive from L7's Channel 1 Feed, duplicates of the Frames continue to arrive from his Channel 2 Feed, the Originator. L7 then replicates these Frames and retransmits them to his Children, L6 and Listener 108d (L5). L6 likewise continues to receive Frames from his Channel 2 Feed, L7, while his Channel 1 Feed is temporarily frozen.

Note that with the present embodiment, it is not guaranteed that a given Listener will continue to receive an uninterrupted series of Frames when a single other Listener stops retransmitting. That is because the Placement Algorithm of the present embodiment makes it possible for a given Listener to have Feed Connections which are from the same other Listener. However, because the Placement Algorithm creates minimum depth Trees, it is guaranteed that this condition is rare. Given a large number of Listeners, statistically, this rare condition has only a small effect.

It is possible for an LTB network using the present embodiment to withstand a very large number of network faults. Even when as many as half the Listeners cease retransmitting, it is possible (depending on the specific pattern of interconnections) for all of the Listeners to continue to receive the broadcast uninterrupted. In practice, the LTB network can withstand a large number of network faults, while providing an uninterrupted broadcast to the great majority of Listeners.

Figure 13A:
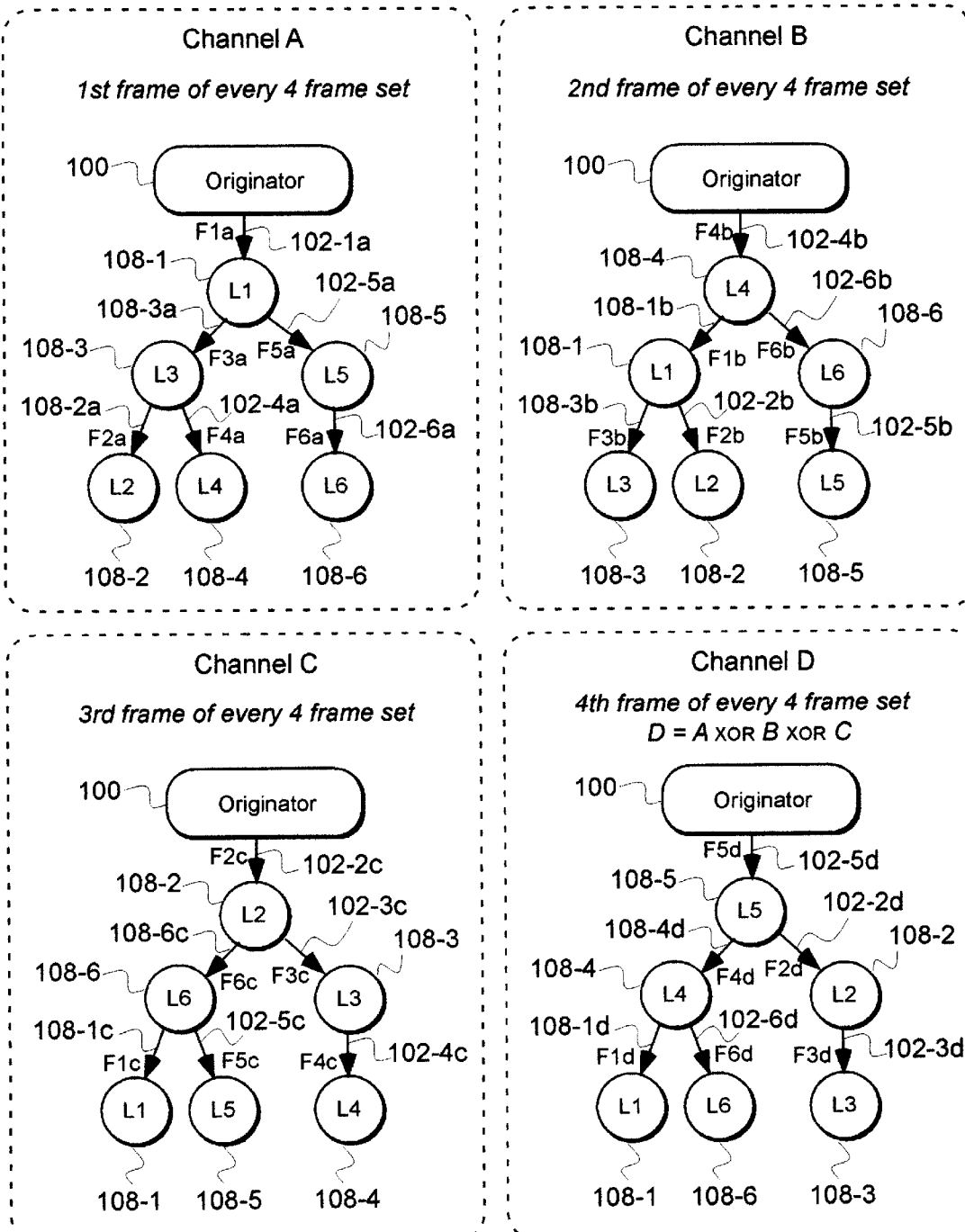
FIG. 13a shows a Balanced 4-Channel LTB with 1 redundant Channel, called a 4/3×Redundant LTB, as an example of a Fractionally Redundant LTB.
Figure 13B:
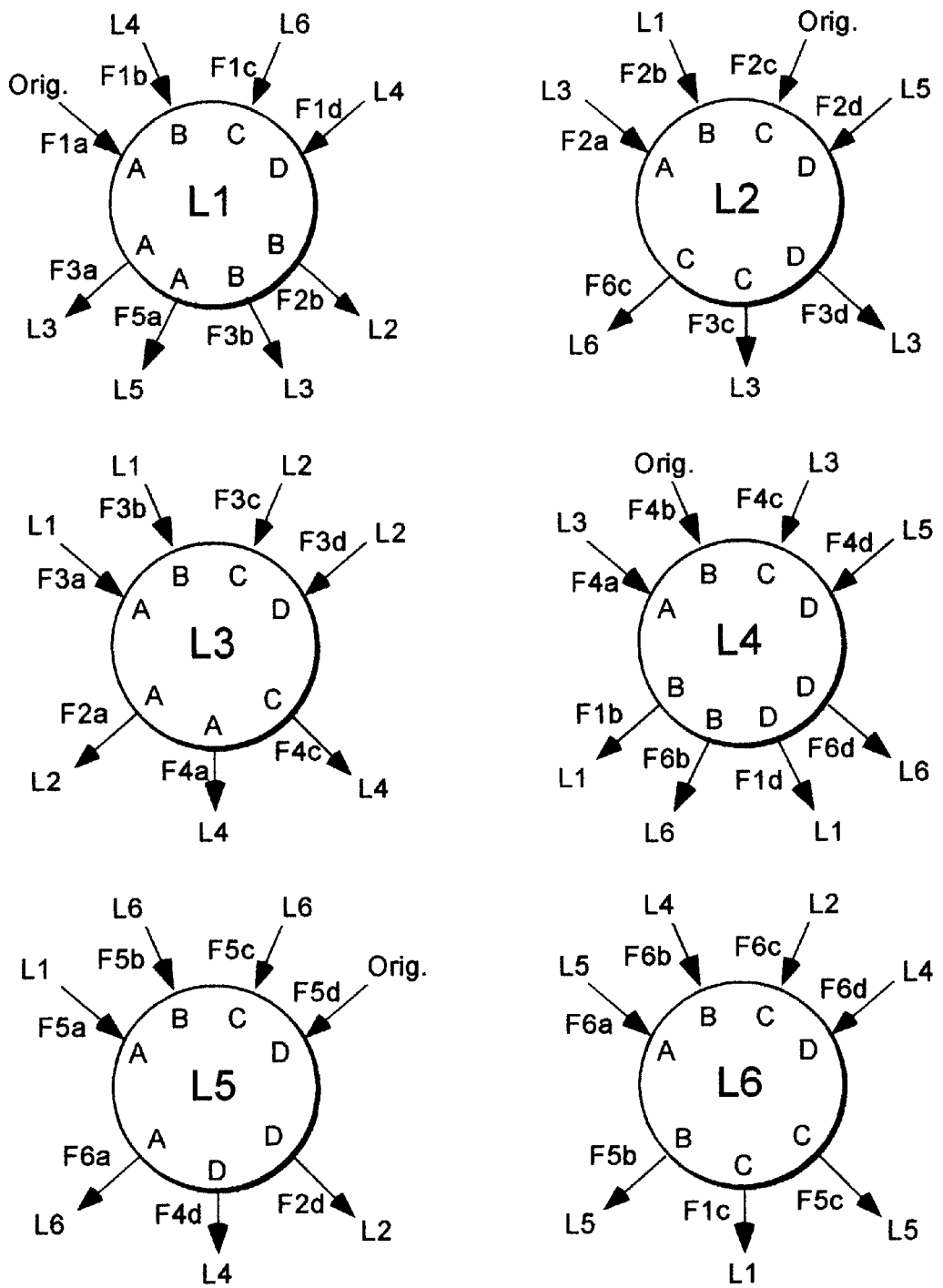
FIG. 13b shows another view of the 4/3×Redundant LTB.

FIGS. 13a and 13b—Fractionally Redundant LTB Network

FIGS. 13a and 13b illustrate an LTB network with fractional redundancy, or a Fractionally Redundant LTB network. Shown is the preferred embodiment, which is a 4-Channel LTB network, where one of the four Channels is redundant. This is called a 4/3xRedundant LTB network. In the 2xRedundant LTB network described earlier, the entire Data Stream is replicated. With a Fractionally Redundant LTB network, the redundancy bandwidth can be a fraction of the Data Stream bandwidth.

As described previously, the Data Stream is formatted into a series of sequentially numbered Frames, but with an extra Frame inserted after every 3 Frames. The extra Frame is computed as the XOR (exclusive OR) of the previous 3 Frames. The XOR operator has the following properties:

$$A \text{ XOR } A = 0 \qquad \text{Eq.1}$$

$$A \text{ XOR } 0 = A \qquad \text{Eq.2}$$

$$A \text{ XOR } B = B \text{ XOR } A \qquad \text{Eq.3}$$

$$A \text{ XOR } (B \text{ XOR } C) = (A \text{ XOR } B) \text{ XOR } C \qquad \text{Eq.4}$$

Call the 4 Frames of each set Ca, Cb, Cc and Cd. These 4 Frame make up a Frame Set. As described, Cd is derived from the other 3 Frames of the Frame Set by:

$$Cd = Ca \text{ XOR } Cb \text{ XOR } Cc \qquad \text{Eq.5}$$

Applying the above equations, it is possible to regenerate any single missing Frame of the Frame Set with the other 3 Frames. Given Ca, Cb, and Cc, then Cd can be regenerated using Eq. 2. Given Cb, Cc and Cd, then Ca can be regenerated by:

$$Ca = Cd \text{ XOR } Cb \text{ XOR } Cc \qquad \text{Eq.6}$$

Applying Eq. 1 through 3, it can be seen that $$Ca = (Ca \text{ XOR } Cb \text{ XOR } Cc) \text{XOR } Cb \text{ XORCc} \qquad \text{apply Eq.5}$$

$$Ca = Ca \text{ XOR}(Cb \text{ XOR } Cb) \text{XOR}(Cc \text{ XOR } Cc) \qquad \text{apply Eqs.2, 3}$$

$$Ca = Ca \qquad \text{apply Eqs.1, 2}$$

In general, it can be seen that applying the XOR operator to any 3 Frames of the Frame Set yields the 4th Frame.

For a given Frame, the Frame Set number is computed as

Frame Set number=floor[(frame number)/$N$]

where N is the number of Channels, and where the floor operator produces the greatest integer less than or equal to its operand. Frames are considered to be in the same Frame Set if they share the same Frame Set number. Frames are numbered from zero. Frame numbers wrap always wrap around at an even multiple of the number of Channels.

The first Frame of each Frame Set is broadcast over the Channel 1 Tree. The second frame is broadcast over the Channel 2 Tree. The third frame is broadcast over the Channel 3 Tree. The fourth frame, computed as the XOR of the other 3 Frames, is broadcast over the Channel 4 Tree.

Each Listener occupies on Node in each of the four Trees. Therefore, each Listener has 4 Feed Connections, over which it receives each of the 4 Channels, respectively. The data arrives over each Feed Connection as a series Frames. Referencing FIG. 4, these Frames are fed into the Listener's anti-aliasing filter 208. There, they are buffered, and reordered into their original sequence. As soon as 3 Frames of the next Frame Set are available, Frame Combiner 218 computes the cumulative XOR of these 3 Frames to regenerate the missing Frame. Then, the 4th Frame of the Frame Set is discarded. The other 3 Frames are merged to regenerate the Data Stream, which is fed into Data Stream Sink 210.

FIG. 13a illustrates an example of a 4-Channel LTB network with one redundant Channel. Originator 100 formats the Data Stream into a series of sequentially numbered Frames. The Frames are grouped into contiguous sets of 3, to which sets a 4th Frame is added which is the XOR of the other 3 Frames, forming Frame Sets of 4 Frames each. For each Frame Set, the first Frame is disseminated over the Channel A Tree. The second frame is disseminated over the Channel B Tree. The third frame is disseminated over the Channel C Tree. The fourth Frame is disseminated over the Channel D Tree.

Each Listener 108-1 through 108-6 has a place in each of the 4 Trees, one Tree for each Channel. In each Tree, a Listener has a Feed Connection, over which it receives the Frames for that Channel. For example, Listener 108-1 (L1) receives its Channel A Frames over Feed Connection 102-1a (F1a) from the Originator. It receives its Channel B Frames over Feed Connection 108-1b (F1b), from Listener 108-4 (L4). It receives its Channel C Frames over Feed Connection 108-1c (F1c), from Listener 108-6 (L6). It receives its Channel D Frames over Feed Connection 108-1d (F1d), from Listener 108-4 (L4).

FIG. 13b illustrates this same information in a Listener-centric view. The same names L1 through L6, and F1a through F6d, first referenced in FIG. 13a are used in FIG. 13b, rather than the corresponding reference numerals. The abbreviation Orig. is used to indicate the Originator. The Channel inputs (Channel Slots) and outputs (Child Slots) are labeled with their corresponding Channel letters, A through D. Thus, for example, Listener L1 is shown with 4 Feed Channels: the Originator for Channel A, L4 for Channel B, L6 for Channel C, and L4 for Channel D. L1 is shown with 4 Children: L3 and L5 for Channel A, and L3 and L2 for Channel B.

In general, it is possible to arrange an LTB broadcast with any number of Channels, and with any number of those Channels being redundant (as long as there is at least one non-redundant Channel).

Figure 14:
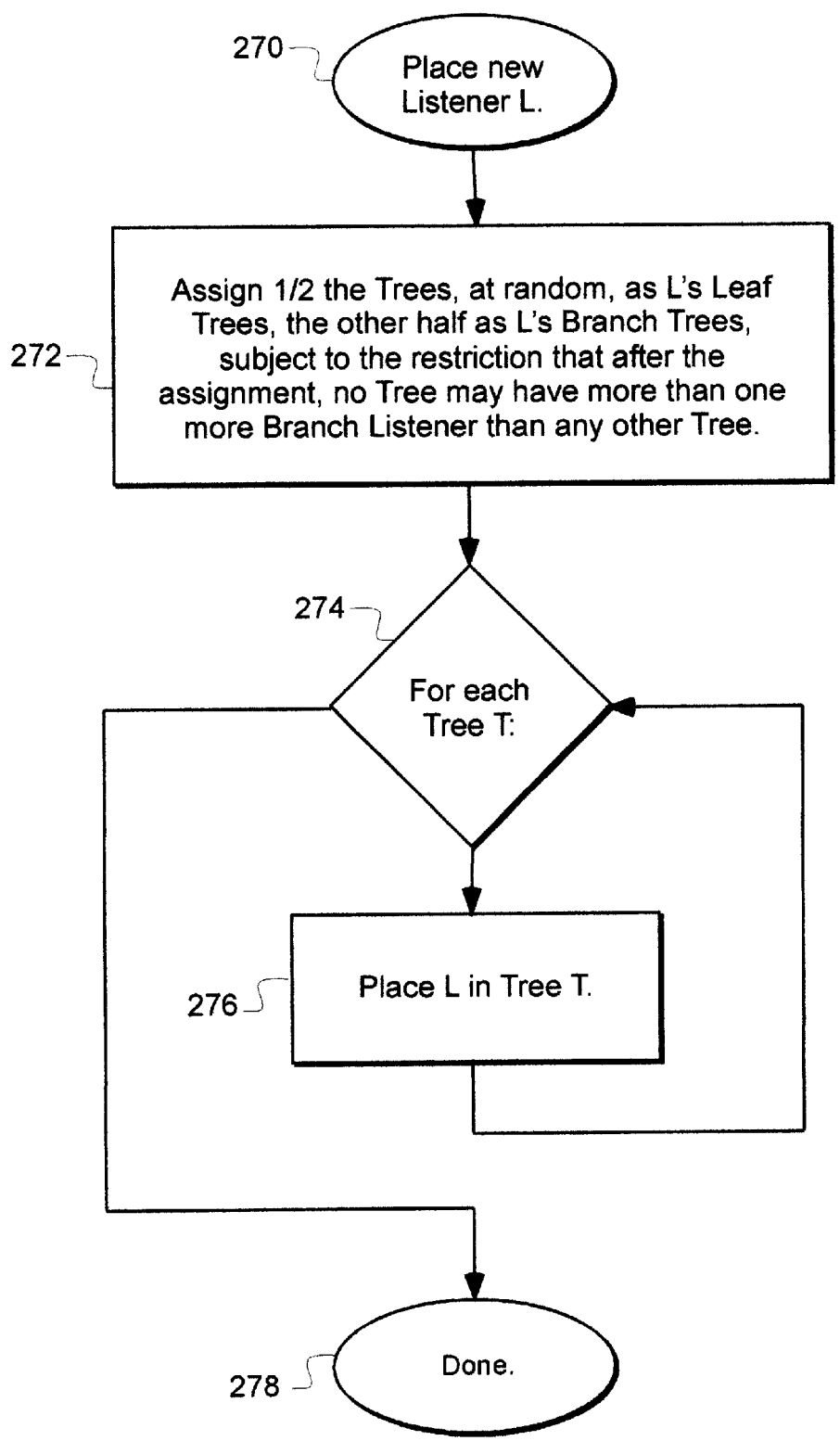
FIG. 14 is a flowchart of the Placement Algorithm for an n-Channel LTB, where n is even.

FIG. 14—Placement Algorithm for LTB Network With an Even Number of Channels

The Placement Algorithm for a 4-Channel LTB network works on the same principle as previously described for a 2-Channel LTB network. The four restrictions on placement in a 2-Channel LTB network can be generalized to any Balanced LTB network with an even number of Channels. Only the first restriction needs to be further generalized:

1) The new Listener is made a Leaf Listener in half the Trees, and a Branch Listener in the others, so that the number of Branch Listeners in one Tree is never more than one greater than the number of Branch Listeners in the other Trees.
2) The new Listener is placed in each Tree so that no Branch Listener of that Tree has more than 2 Children in that Tree.
3) The new Listener is placed in each Tree so that no Leaf Listener of that Tree has any Children in that Tree.
4) In a given Tree, a new Branch Listener is never placed at a deeper level than any Leaf Listener.

FIG. 14 illustrates the process. At step 270, new Listener L is to be placed in an n-Channel LTB network. At step 272, each Channel's Tree is assigned as being L's Leaf Tree or Branch Tree. Half the Trees (n/2) are assigned as Leaf Trees, and the other half as Branch Trees. The assignments are arbitrary (preferably random), subject to the restriction that after all the assignments, no Tree may have more than one more Branch Listener than any other Tree. At step 274, the Placement Algorithm iterates through each Tree T. At step 276, new Listener L is placed in Tree T, according to the algorithm of FIG. 11b. After L is placed in each Tree, at step 278, the Placement Algorithm is finished.

It can be seen that the above algorithm satisfies the restriction that no Listener may have more Children than Channels. This is because the Listener is a Branch Listener in only ½ the Trees, and can have a maximum of 2 Children in each Branch Tree. It can also be seen that the algorithm satisfies the restriction that each Tree remains balanced, for the same reasons as discussed earlier for the 2-Channel case.

Figure 15:
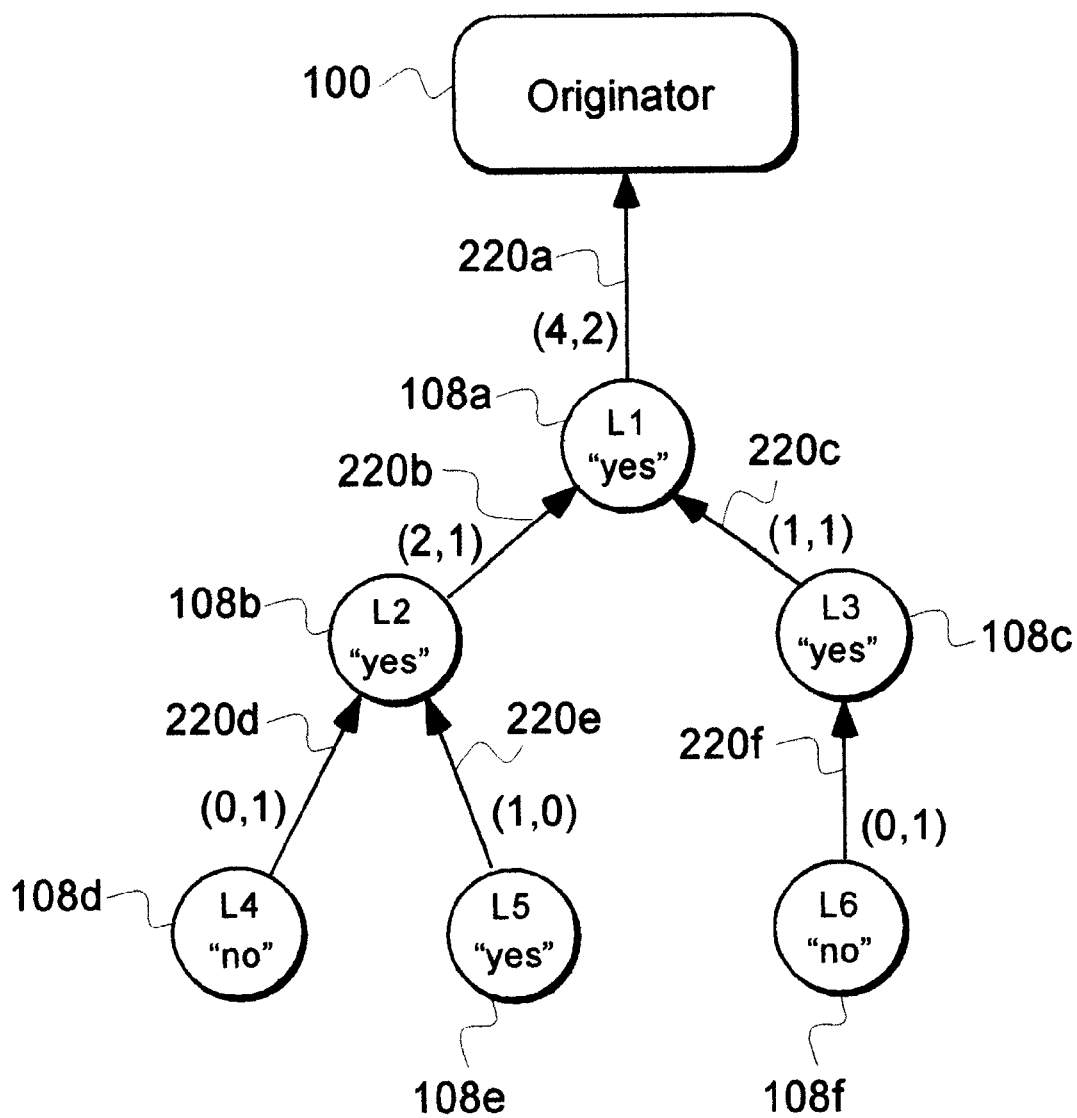
FIG. 15 shows the statistics gathering mechanism using Feedback Connections.

FIG. 15—Gathering Listener Statistics

FIG. 15 illustrates a feature of the present invention which allows feedback to be efficiently gathered from the Listeners of an LTB network. Normally, Feed Connections are used to send Frames to a Listener from its Feed. However, it is also possible for Listeners to send information to their Feeds. A Feed Connection used in the reverse direction is called a Feedback Connection. The present method makes use of Feedback Connections.

The present method is used in a context where it is desired for the Originator to gather some kind of statistical information about the Listeners of the LTB network. For the purpose of this illustration, suppose the Listeners are asked a Yes/No question, and the goal is for the Originator to receive a tally of the answers. Listener 108e (L5) answers "yes". She and sends an object to her Feed, Listener 108b (L2), over Feedback Connection 220e. The object consists of a response vector containing (1, 0), indicating a total of 1 Yes vote and 0 No votes. Meanwhile, Listener 108d (L4) answers "no", and sends response vector (0, 1), indicating 0 Yes and 1 No vote, on Feedback Connection 220d to his Feed, L2. When L2 receives a response from both his children, L4 and L5, he sums their response vectors, and adds his own "yes" answer. The resulting response vector, (2, 1), indicating 2 Yes and 1 No votes, is set on Feedback Connection 220b to L2's Feed 108a (L1).

Likewise, L1 waits for the response vector from her other Child 108c (L3), who in turn waits for the response from his Child 108f (L6). Each Listener adds his own answer to the response vectors he receives from his Children, and sends the resulting response vector on to his Feed. Eventually, after all Listeners have provided their answers and forwarded their cumulative result vectors, the Originator receives a result vector which represents the cumulative response from all Listeners.

Measurement of Transmission Latency

One use for the Feedback Statistics mechanism is to monitor the transmission latency of the LTB network. When the Originator and Listeners first join the LTB network, they are returned a reference timestamp from the Broadcast Manager. This timestamp is compared to the local time, to producing a reference time offset. The Originator attaches a timestamp to each Frame before it is transmitted, the timestamp being adjusted by the reference time offset to produce a reference timestamp.

As a given Listener receives each Frame, the Listener produces a timestamp adjusted by the reference time offset, to produce a local reference timestamp, and subtracts from this the reference timestsamp attached to the Frame. The result is approximately equal to the total delay from the time the Originator transmitted the Frame to the time it was received. This delay is an estimate of the instantaneous latency for the Channel corresponding to the Frame.

Various statistics are computed by the Listener for the latency of each Channel. These statistics include, as examples, the average latency within a window of time and the maximum latency within a window of time. The average latency is represented as a total latency and a number of Listeners—the average being computed as the total divided by the number of Listeners.

The window of time is computed based on the Frame numbers. In one embodiment, one period of time is equal to one iteration through all the Frame numbers, before the Frame number wraps around to zero. Whenever a Listener receives a Frame on a given Channel, which Frame's Frame number is wrapped around from the previous Frame on that Channel, the latency statistics are saved. If there are no Children on that Channel, a statistics object, containing the statistics for that Channel for the previous time period, is sent in the reverse direction on that Channel, as previously described.

The cumulative latency statistics for a given Listener are initiated to the latency statistics for the Listener itself, as described above. When a latency statistics object is received on a Child Slot, the statistics contained in that object are combined into the cumulative statistics of that Listener. The total latency is added to the cumulative total latency. The number of Listeners is added to the cumulative number of Listeners. The cumulative maximum Latency is set to the greater of the current cumulative maximum latency and the object's maximum latency.

After receiving a latency statistics object on all the Child Slots attached to a given Channel, and combining these statistics into the cumulative statistics for that Listener, the Listener transmits the latency statistics object to that Listener's Feed on that Channel, as previously described. Eventually, a cumulative latency statistics object for each Channel is transmitted to the Originator. Ultimately, these latency statistics are displayed to an operator, allowing the operator to monitor the condition of the LTB network. The same method can be used to monitor other operational statistics.

Figure 16:
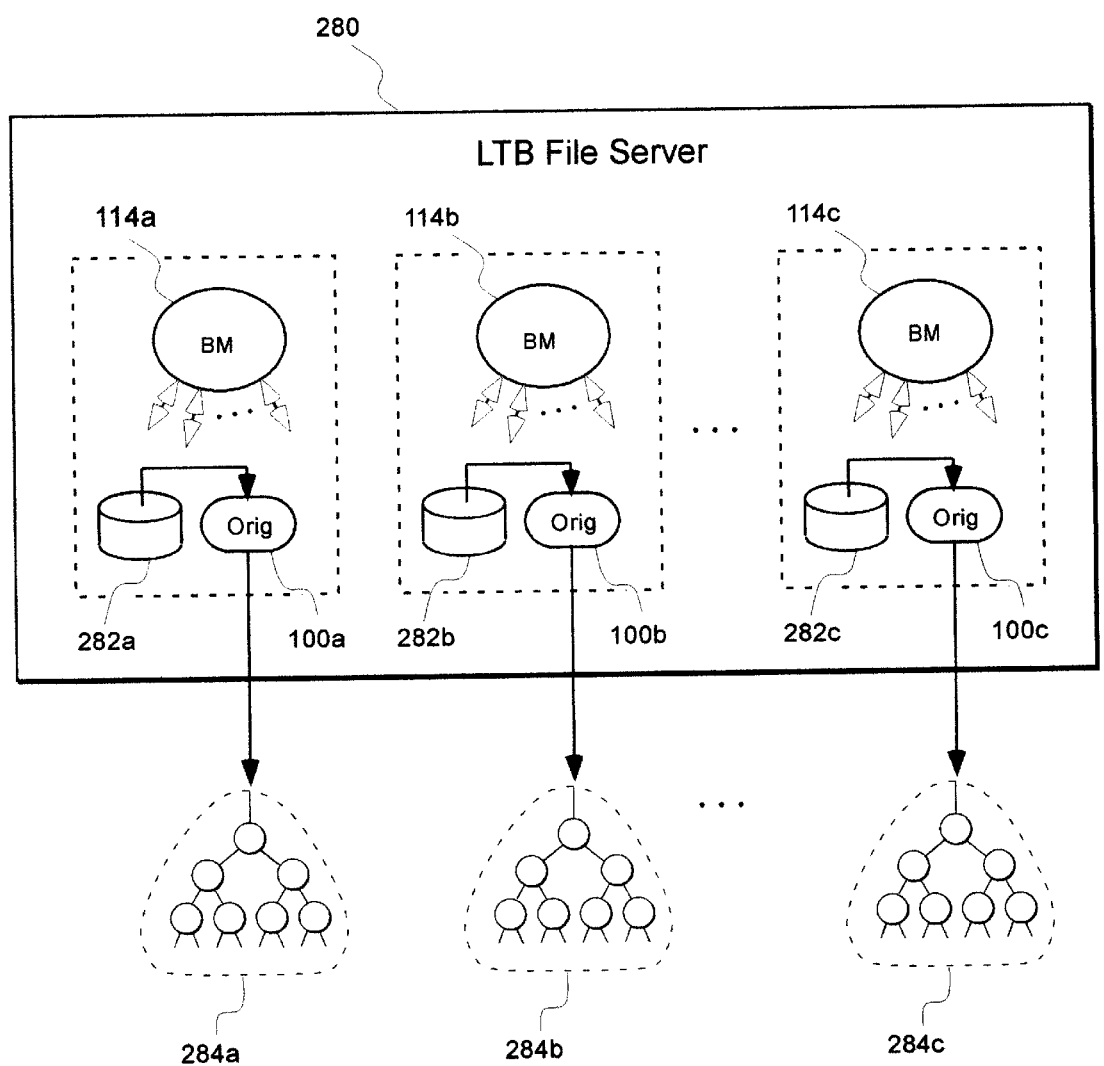
FIG. 16 shows a file server employing LTB networks to distribute the files.

FIG. 16—LTB File Server

FIG. 16 illustrates a file server which employs LTB networks to distribute files. Each file is associated with its own LTB network. The file is broadcast continuously in a circular fashion—as soon as the end of the file is reached, broadcasting begins again at the start of the file. The file is broadcast at some specified bandwidth. When a user wants to download a file, they join the LTB network associated with that file. To do this, the user connects to the file's Broadcast Manager, in the usual manner. At this time, the user is informed of the file's size, and the number of Frames in the file. The user is then joined into the LTB network in the usual manner. The user's Data Stream sink (210 in FIG. 4) becomes a file on the user's local hard disk. The user remains connected to the broadcast until all the Frames have been received, and saved to the disk. In the event that any Frames are missed, the user remains attached to the file's LTB network for one or more additional passes, until all the Frames have been received.

Referring to FIG. 16, LTB file server 280 hosts a number of files 282*a–c*. A user who wants to download file 282*a* connect to Broadcast Manager 114*a*, which joins the user into LTB network 284*a*. The file is fed as the Data Stream source into Originator 100*a*, in a circular fashion. As soon as the last Frame of the file has been transmitted, broadcasting starts again starting with the first Frame. The Broadcast Manager informs the user of the size of the file, and the number of Frames in the file, when the user first connects. At this time, the user creates a blank file of the appropriate size, in which incoming Frames are stored, at the correct offsets. The last Frame will generally be only partially filled with file data.

The file is sent out at some fixed bandwidth, in the usual fashion. In general, the user will start receiving the file somewhere in the middle. As data is produced at the user's data stream sink (210 in FIG. 4), it is saved in the user's file, at the appropriate offset corresponding to the Frame numbers of the received Frames. A table is kept of the Frame numbers which have been received. As soon as all Frames have been received, the user removes himself from the LTB broadcast, notifying the Broadcast Manager in the usual fashion. Note that it may be necessary for the user to remain connected through more than one iteration of the file, if any Frames were skipped due to network problems.

In the illustration, files 282*b–c* are likewise associated with Broadcast Managers 114*b–c*, respectively. The files' contents are sent to Originators 100*b–c* in a circular fashion, and broadcast to LTB networks 284*b–c*, respectively. The LTB file server may host any number of files in this manner.

This method of file distribution makes sense when there is a need to distribute a relatively small number of relatively large files. In this case, the bandwidth requirement for file distribution becomes a limiting factor. By employing LTB networks to distribute the files, the distributor of the files is relieved of the bandwidth burden, sharing that burden among the users who are downloading the file.

A refinement of the above method is to split large files into a number of smaller ones, broadcasting each piece as a separate file, then re-assembling the file's pieces on the user's own computer. The main reason to do this is to overcome bandwidth limitations. An LTB network must broadcast at some fixed upper bandwidth limit. The greater this limit is, the fewer the users there are with adequate bandwidth to join the LTB network. However, users with high bandwidth connections would like to be able to download files at a faster rate. With the present refinement of the LTB file server method, such a user can download several pieces of the file simultaneously—becoming a Listener in several LTB networks at once, thus receiving the file at a faster rate. This refinement also provides a form of file transfer resumption. When a transfer is terminated and resumed later, only the file pieces which haven't yet been received need to be transferred.

Figure 17:
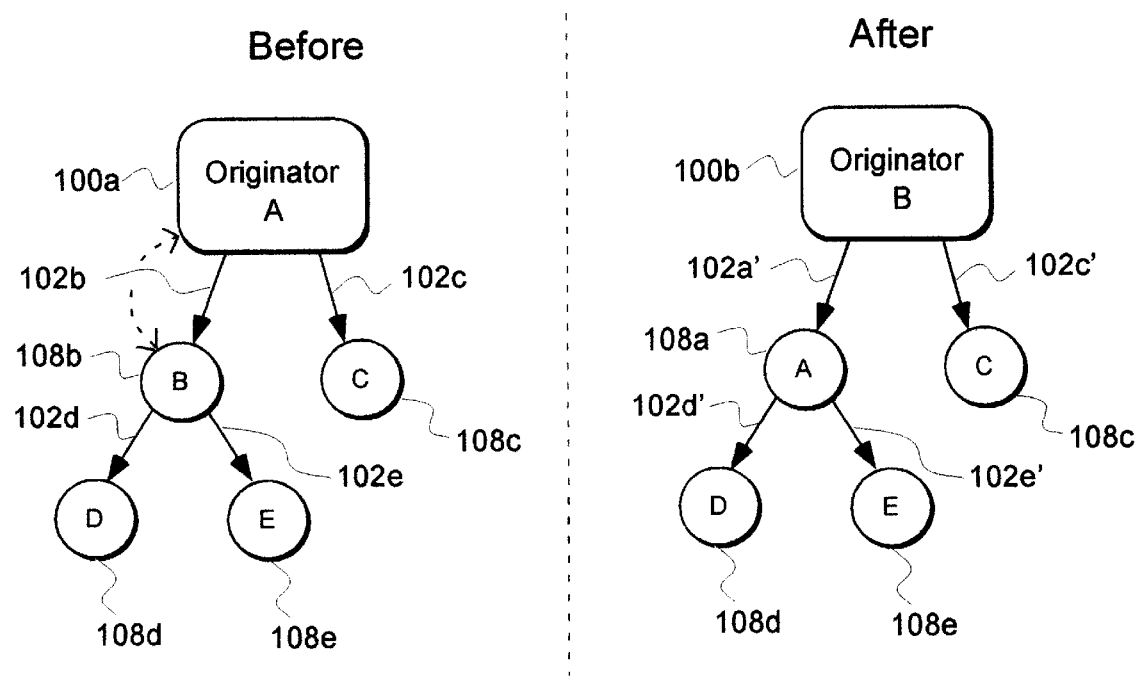
FIG. 17 shows a Listener swapping place with the Originator.

FIG. 17—Swapping Places With the Originator

FIG. 17 illustrates a Listener swapping places with the Originator. Call the current Originator A, and the Listener with which it is swapping places B. The swap is accomplished by concurrently switching B's Children over to A, switching A's Children over to B, initiating Feed Connections to A from all of B's Feeds (one for each Channel), and disconnecting all of B's Feed Connections. B then takes on the role of Originator, and A takes on the role of Listener.

There is a complication when B is a Child of A. This complication is illustrated in FIG. 17, which depicts a single-Channel case. Listener 108*b* (B) sends a request to the Broadcast Manager to swap places with Originator 100*a* (A). The Broadcast Manager sends the necessary Connect Objects to various Listeners. Listener 108*d* is instructed to drop Feed Connection 102*d* going to B, and initiate Feed Connection 102*d'* going to A. Listener 108*e* is instructed to drop Feed Connection 102*e* going to B, and initiate Feed Connection 102*e'* going to A. Listener 108*c* is instructed to drop Feed Connection 102*c* going to A, and initiate Feed Connection 102*c'* going to B. A is instructed to initiate Feed Connection 102*a'* going to B. B is instructed to drop Feed Connection 102*b* going to A.

In general, it is also possible for a new user to take on the role of Originator, replacing the current Originator, without having first become a Listener. In this manner, there can be multiple users taking on the role of Originator at different times.

Figure 18:
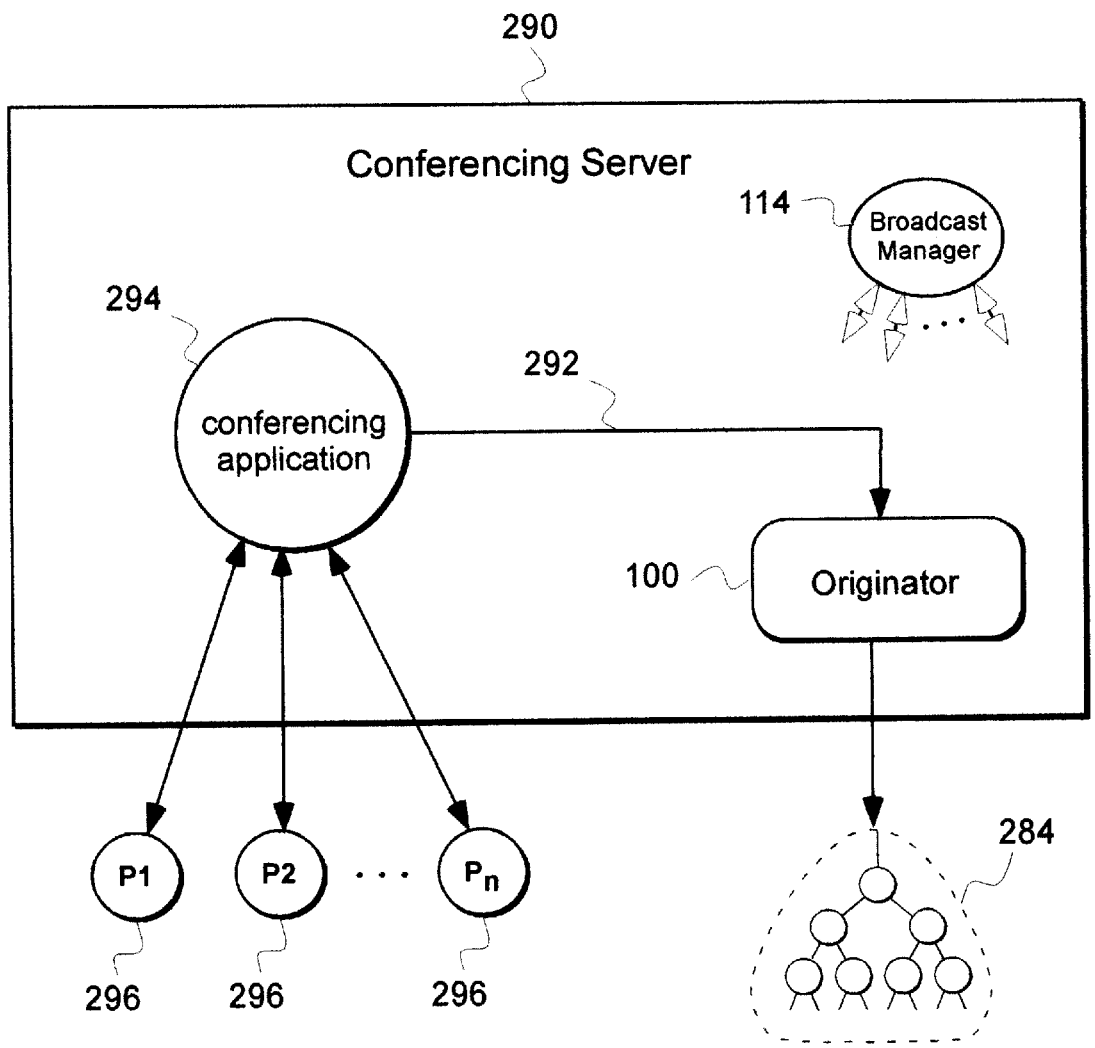
FIG. 18 shows a conferencing application using an LTB network.

FIG. 18—Conferencing Server Using LTB Broadcasting

FIG. 18 illustrates conferencing server 290 making use of an LTB network to broadcast the conference to a group of Listeners. Conference participants 296 (including talkers and moderators) interact with conferencing application 294. Any conferencing application can be used. The conferencing application produces media stream 292. This media stream is the Data Stream source (212 in FIG. 5) for Originator 100. The Originator is dedicated for use in disseminating the conference. Broadcast Manager 114 is dedicated to managing LTB network 284, over which the conference is broadcast to a group of Listeners.

Figure 20:
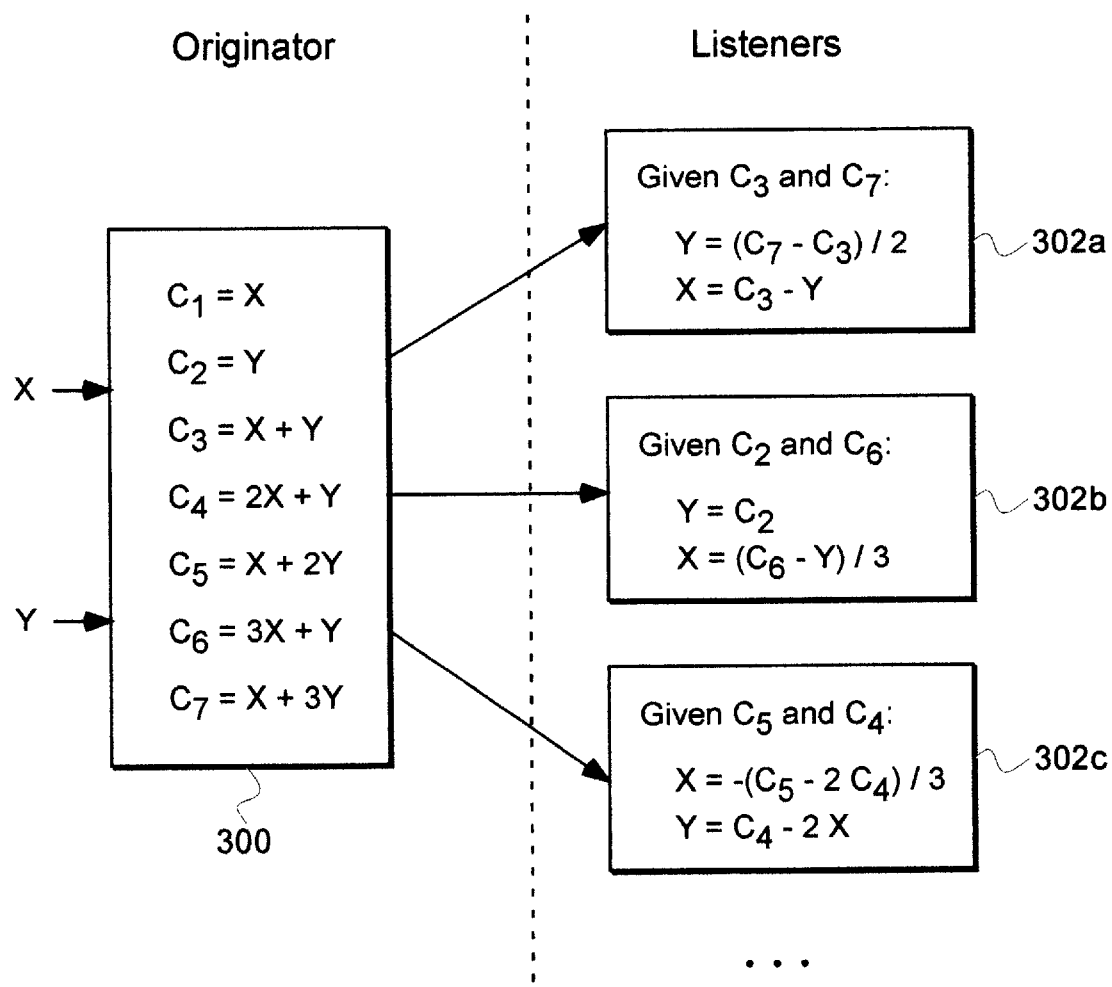
FIG. 20 shows an algebraic method to achieve fractional redundancy.

FIG. 20—Algebraic Method to Achieve Fractional Redundancy

FIG. 20 illustrates an improved method by which fractional redundancy can be achieved, whereby a PPM network can be configured to use any number of redundant Channels in combination with any number of Channels (as long as the number of redundant Channels is at least one fewer than the number of Channels). The method described earlier, using the XOR operator, is limited in that it can only work in the case where there is a single redundant Channel in an LTB network with three or more Channels.

The Originator divides the Data Stream between a number of Real Channels. A Real Channel is like a Channel, except that it is not transmitted. The Real Channels are combined into a larger number of Channels, which are then transmitted. For the purposes of this discussion, R is the number of Real Channels, and N is the number of Channels, where N is larger than R, and R is at least one. The redundancy factor of an LTB network is N/R. In FIG. 20, R is 2, and N is 7, so the redundancy factor is 7/2. X and Y are the Real Channels.

The Frames making up a Real Channel are called Real Frames. Frame Sets of Real Frames are called Real Frame Sets. Real Frames are numbered in increasing order, but with gaps in the numbering, so that each Real Frame Set is offset from the next by N, even though there are only R Real Frames in a Real Frame Set. The Originator combines the R members of each Real Frame Set according to a set of functions, called Generation Functions, to produce N members of a corresponding Frame Set. There is one Generation Function per Channel. Each Generation Function is a linear combination of the Real Channels. In the figure, Channels $C_1$ through $C_7$ are generated from Generation Functions 300, each being a linear combination of Real Channels X and Y. $C_1$ is a copy of X, $C_2$ is a copy of Y, $C_3$ is the sum of X and Y, and so on.

In the figure, X and Y can be considered to represent single Real Frames of a Real Frame Set. $C_3$, then, is the result of adding X to Y, as if each Real Frame were a single integer with a very large number of bits. Similarly, Frames $C_4$ through $C_7$ are computed as linear functions of X and Y, as illustrated.

Any number of unique Channels can be generated in this manner. The only restriction is that the Generation Functions be independent, in a linear algebraic sense. That is to say that no Generation Function can be a linear combination of any set of (R-1) other generation functions. In the figure, with R being 2, the restriction becomes: no Generation Function can be a multiple of another Generation Function.

As the Frame Sets are computed, their members are directed to their corresponding Channels $C_1$ through $C_7$. Each Channel is transmitted from the Originator to one or more Listeners, and from those Listeners to other Listeners, and so on, through an LTB network, as previously described.

When a given Listener receives R Frames of a Frame Set, that Listener can regenerate the (N—R) missing Frames of the set. The first step is to regenerate the Real Frame Set from the partial Frame Set so far received. There are well known techniques of linear algebra to solve R independent linear functions for R unknowns. Such techniques yield, for each unknown, a linear function in terms of the original linear functions, by which the unknown can be computed. Using these techniques, given any set of R Channels, a Regeneration Function is computed for each Real Channel, whereby that Channel can be calculated as a linear function of the R received Channels.

Once the Real Frame Set is computed using the Regeneration Functions, it is fed into the Frame Combiner (218 in FIG. 4). In addition, if any of the missing Frames are from Channels which need to be retransmitted (i.e. Channels which are connected to one or more Child Slots 202d–f in FIG. 4), then the missing Frames are computed from the Real Frame Set using the corresponding Generation Functions 300.

It can be seen that a Frame from a given Channel can be retransmitted before that Frame arrives at the Channel Slot (102a–c in FIG. 4). As soon as R other Frames of the same Frame Set have arrived, the given Frame is regenerated and transmitted. When the Frame for that Channel finally arrives, it is simply discarded.

In FIG. 20, Listener 302a receives a Frame in the same Frame Set from each of Channels $C_3$ and $C_7$. Frames in a Frame Set are referred to by the name of the corresponding Channel. So, Frames $C_3$ and $C_7$ have been received. As soon as the second Frame is received, the other 5 Frames of the Frame Set can be computed. The first step is to regenerate the corresponding Real Frame Set, consisting of X and Y. Solving the two Generation Function equations, one for $C_3$ and the other for $C_7$, for the two unknowns X and Y, two Regeneration Functions are computed. These are shown in 302a. Thus, Y is calculated by subtracting $C_3$ from $C_7$, then dividing the result by 2. Once Y is calculated, X can be regenerated as $C_3$ minus Y. Once X and Y are calculated, they form a Real Frame Set, which is sent to the Frame Former to regenerate part of the Data Stream.

Suppose that Listener 302a is required to retransmit Channels $C_6$ and $C_7$. These can each now be computed, as functions of X and Y, using the original Generation Functions. As they are computed, they are transmitted. For example, $C_6$ is computed as 3 times X plus Y. Eventually, one or both of the corresponding Frames for $C_6$ and $C_7$ may arrive. If and when they do, they are simply discarded.

In the figure, Listeners 302b and 302c are each shown receiving a different set of Channels. The corresponding Regeneration Functions are shown in each case.

Note that as a result of applying arithmetic operations to the Frames, overflow can be expected. Therefore, the Channels and Real Channels are augmented with some number of extra Overflow Bytes, in the most-significant-byte locations. For the Real Channels, these Overflow Bytes are set to zero. There must be sufficient Overflow Bytes so that in the worst case, there cannot be any arithmetic overflow or underflow of the augmented Frames. In the present embodiment, each Frame and Real Frame is augmented with 2 Overflow Bytes.

Auditing of LTB Transmissions

It is possible to audit the transmissions of an LTB Listener to ensure that the great majority of the transmitted data is simply a copy of, or a derivation of, received data. There is a small amount of transmitted data which cannot be audited, because it is not a copy of received data. Such data includes Objects sent to the Broadcast Administrator, and some Objects sent to Feeds and/or Children. The purpose of the auditing process is to ensure that the great majority of transmitted data is benign—that is, simply a copy of, or derivation of, received data. In particular, the Frames can be audited.

The auditing process involves making certain information available to an auditor program. A certain amount of static information is required, allowing the auditing program to parse received and transmitted Channels into their constituent Frames, and allowing the Frame numbers to be extracted.

In addition to this static knowledge, some dynamic information is required: in particular, the generation and regeneration functions (if any) by which the Channels are computed. This information is passed from the Listener program to the auditor program through an appropriate API.

The auditor program then parses each received Channel into the constituent Frames. As the incoming Frames arrive for each Channel, they are saved to a dictionary of received Frames. In the case of fractionally redundant LTB networks, missing Frames of each set are regenerated as soon as sufficient Frames for that set arrive, as previously described. These regenerated Frames are likewise added to the dictionary of received Frames.

Before a Frame is transmitted, it can be checked against this dictionary of received Frames. If the Frame is not found in the dictionary, an alert is generated to indicate an illegal transmission. As a result, the Listener program may be shut down. It is not necessary to examine every transmitted Frame. In fact, it is sufficient to check only a small, random fraction of Frames. If there is a substantial amount of unauthorized transmission taking place, it will quickly be detected.

When a Frame is added to the dictionary of received Frames, any existing Frame with the same Frame number is overwritten. In this manner, the size of the dictionary is kept relatively small. This technique works because Frame numbers are represented in a fixed number of bits, so the Frame numbers wrap around periodically.

Combining the Functions of Listener and Originator

In a Balanced LTB network, with N Channels, there are, at any given time, N unused Child Slots, spread among the Listeners. For example, in FIG. 10, depicting a Balanced 2-Channel LTB network, Listener 108d (L4) has both Child Slots unused—that is, L4 does not transmit either Channel to any other Listener. In FIGS. 13a and 13b, depicting a Balanced 4-Channel LTB network, Listeners L2, L3, L5 and L6 each have one unused Child Slot—that is, each transmits on only 3 Child Slots.

These unused Child Slots can be advantageously used to transmit each Channel back to the Originator. Several Listener components depicted in FIG. 4 are added to the Originator as depicted in FIG. 5: the Channel Slots 200a–c, the Frame collection data path 206, the anti-jitter buffer 208, Frame Combiner 218, and the Data Stream sink 210. These parts operate as previously described for a Listener. Each of the N unused Child Slots previously referred to are connected to a Feed Connection, which is in turn connected to a Channel Slot on the Originator, each Channel being transmitted to the corresponding Channel Slot.

In the example of FIG. 10, Child Slot 1 of L4 is used to transmit Channel 1 to Channel Slot 1 of the Originator, while Child Slot 2 of L4 is used to transmit Channel 2 to Channel Slot 2 of the Originator.

In the example of FIGS. 13a and 13b, Child Slot 4 of L2 is used to transmit Channel A to the Originator's Channel Slot 1. Child Slot 4 of L3 is used to transmit Channel B to the Originator's Channel Slot 2. Child Slot 4 of L5 is used to transmit Channel C to the Originator's Channel Slot 3. Child Slot 4 of L6 is used to transmit Channel D to the Originator's Channel Slot 4.

Frame Size and Alignment

In the preferred embodiment, the Data Stream is divided into a series of Frames, each Frame representing a contiguous block of the Data Stream. A given Listener will always receive data in units of Frames. In the event that some data is not received, due to network problems, the Data Stream flow is interrupted. The flow resumes at the start of the next Frame to arrive. Therefore, it is important that the Frames be aligned so that it is possible to resume the Data Stream meaningfully at the start of any Frame.

In the preferred embodiment, Frames represent equally-sized pieces of the Data Stream. This is a reasonable under certain conditions. Codecs typically organize the compressed media stream into a series of frames, in such a manner that decompression can resume at the start of any frame. Some codecs, such as the GSM codec for speech compression, have fixed-sized frames. When the Data Stream consists of such a codec, then a fixed sized Frame is achieved by placing a fixed number of the codec's frames in each Frame.

Some codecs have frames which can be any size, up to some maximum, where the size of the frame can be determined by parsing a header attached to start of each codec frame. The MEG codec for music compression is an example of this. It is possible for each frame in an MPEG codec to be a different size. In this case, in order to ensure that each Frame is aligned at the start of a codec frame, it is necessary that the Frame be of a variable size. When variable Frame sizes are used, the size of the Frame is represented in the Frame's header, along with the Frame number. As long as Frames are approximately equal in size, the effect will be approximately the same as a design based on fixed Frame sizes. More generally, a design based on a Frames of given ideal sizes works approximately the same way as long as the sizes of those Frames are approximately equal to the ideal sizes.

Irregular Channel Organization

In the preferred embodiment, the Channels are all of equal bandwidth. However, in other embodiments, the same basic design principles are used with irregular-sized Channels. In the most general embodiment, a given Channel may use more than one Child Slot. In one embodiment, each Child Slot represents a fixed amount of transmission bandwidth—in particular, 1000 bits/second, or 1 kbps. Each Channel is assigned a different bandwidth—in even multiples of 1000 bits/second. To transmit an s kbps Channel requires s Child Slots. This set of s Child Slots are all associated with the same connection to the same Child. The Placement Algorithm works in the same manner described previously, whereby it assigns a given Listener's Child Slots to at most one Channel.

Take the example of an LTB network transmitting a 10 kbps Data Stream over two Channels. Channel 1 is 7 kbps, and Channel 2 is 3 kbps. Each Child Slot represents 1 kbps of transmission bandwidth. Each Listener has 15 Child Slots, meaning it must transmit at a maximum rate of 15 kbps, or 50% greater than the rate at which it receives. A given Listener may have 5 Children on Channel 1 (each Child using 3 Child Slots, for a total of 15 Child Slots), or 2 Children on Channel 2 (each Child using 7 Child Slots, for a total of 14 Child Slots), or 2 Children on Channel 1 and 1 Child on Channel 2 (each Channel 1 Child using 3 Child Slots, and the Channel 2 Child using 7 Child Slots, for a total of 13 Child Slots). The Placement Algorithm ensures that each Child Slot is assigned only once.

Figure 21:
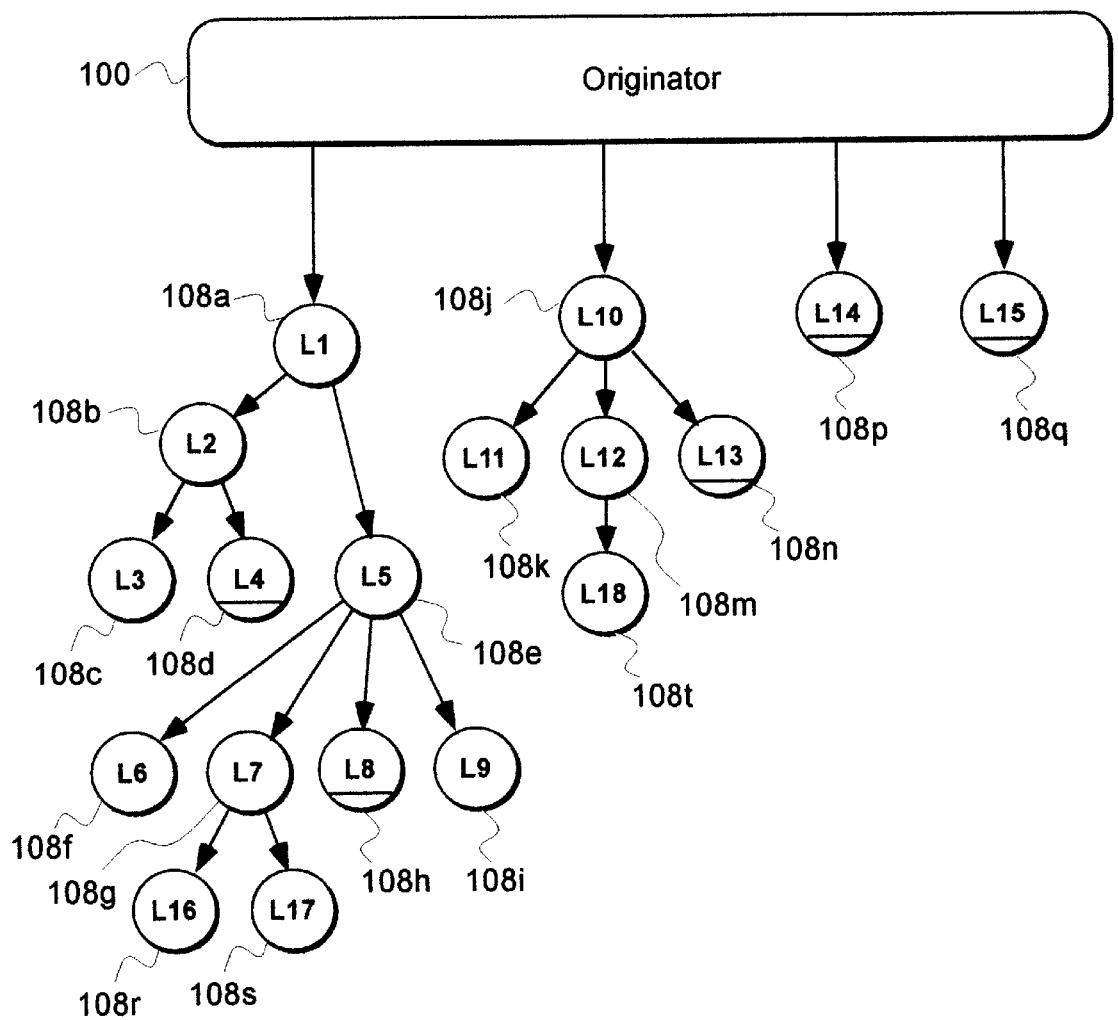
FIG. 21 shows an irregular LTB network.

FIG. 21—Irregular Network Configurations

In the preferred embodiment, the Originator and Listeners all have a Fanout equal to the number of Channels. In the single-Channel embodiment of FIG. 3, the Originator has a Fanout of 1, and each Listener has a Fanout of 2. However, in other embodiments, Listeners and Originators have many different Fanouts. FIG. 21 illustrates an irregular single-Channel LTB network embodiment. Originator 100 has a Fanout of 4 or more, being connected to Listeners 108a (L1), 108j (L10), 108p (L14) and 108q (L15). Listeners L1, 108b (L2),108c (L3),108f (L6),108g (L7) 108i (L9) 108r (L16), 108s (L17), 108i (L9), 108k (L11), and 108t (L18) all have a Fanout of 2, the Note that not all available Child Slots are filled. Listener L10 is a high-bandwidth user who has volunteered to retransmit more than the normal share, and has a Fanout of 3, with 3 Children. Listener 108e (L5) has volunteered to carry a Fanout of 5, and currently has 4 Children. Listener 108m (L12) is a low-bandwidth user, and has a Fanout of 1. Listeners L14, L15, 108n (L13), 108h (L8) and 108d (L4) are all users who are unwilling or unable to retransmit, all with a Fanout of zero, as indicated by the bar across the bottom of their circles.

In the most general embodiment, each Listener may have a different Fanout. In one embodiment, the Fanout assigned to a given Listener is decided by the Listener himself In another embodiment, the Fanout is assigned by the Broadcast Manager, as a function of the Listener's available bandwidth. Any combination of Fanouts is possible as long as the total Fanout of the Originator plus Listeners equals or exceeds the number of Listeners times the number of Channels. When a Listener has a Fanout less than the number of Channels, that Listener is said to be freeloading. The situation can develop where the LTB network has insufficient total Fanout to support the current number of Listeners. In this case, one or more Listeners who are freeloading are removed from the LTB network, until the total Fanout again equals or exceeds the number of Listeners times the number of Channels.

By employing an irregular LTB network configuration, it is possible to accommodate Listeners whose connections do not allow as much transmission bandwidth as they do reception bandwidth. It is also possible to accommodate Listeners who are unable to retransmit at all.

Multiple Simultaneous Broadcasts From Different Originators

In one embodiment, the same LTB network is used to simultaneously broadcast Data Streams originating from multiple different Originators. Each Originator divides their Data Stream into the same number of Channels. In the event that each Channel is to have a different relative bandwidth, each Originator divides their Data Stream appropriately, so that each Channel has the correct relative bandwidth. The Broadcast Manager then instructs each Originator to transmit each of their Channels to the root Listener of each Tree. For example, in the Balanced 2-Channel embodiment of FIG. 10, each Originator transmits their Channel 1 to Listener 108a (L1), and their Channel 2 to Listener 108g (L7). Each Frame is marked to indicate which Data Stream it is from. Listeners then retransmit the Frames according to the single pattern established by the Broadcast Manager, as described previously. Thus, the Frames from multiple different Data Streams are disseminated through the same broadcast network.

This method is more efficient than the alternative method for broadcasting from multiple Originators to the same set of Listeners, wherein each Listener separately joins an LTB broadcast from each Originator. The reason is that a given Listener maintains only a single set of connections to other Listeners, rather than one set of connections for each Originator's broadcast.

Figure 22:
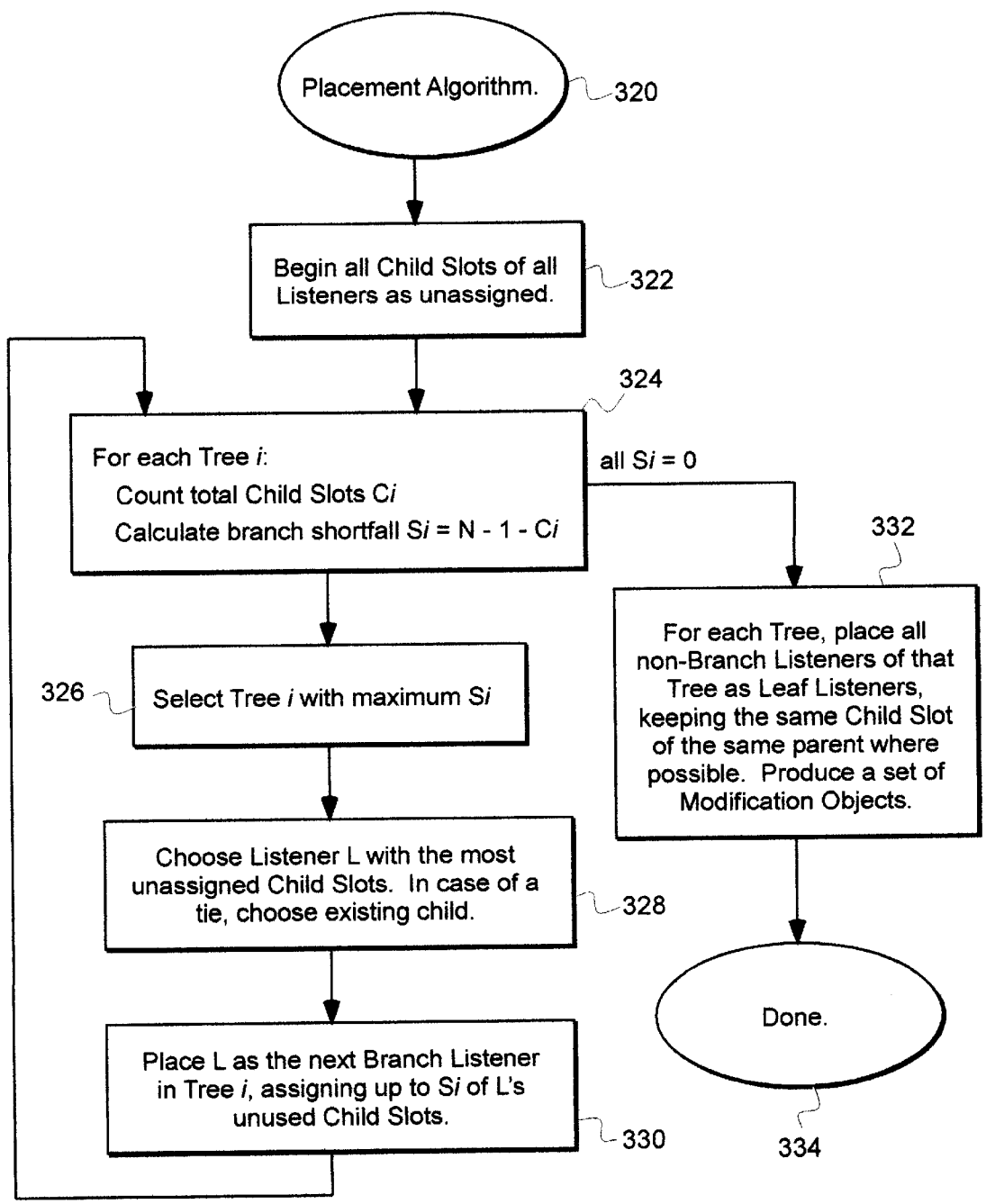
FIG. 22 shows a flowchart for a generalized Placement Algorithm.

FIG. 22—Generalized Placement Algorithm

In the preferred embodiment, each Listener has the same Fanout, that Fanout being equal to the number of Channels. A more generalized embodiment allows for each Listener to have any Fanout. As with any Placement Algorithm, a primary design goal is to reduce the number of connection changes required within the LTB network.

The flowchart of FIG. 22 illustrates the Placement Algorithm used in this embodiment, beginning at step 320. At step 322, all Child Slots of all Listeners are marked as being unassigned. As the Placement Algorithm unfolds, each Child Slot of each Listener may be assigned to a Tree. Upon successful completion of the algorithm, each Tree will have N−1 Child Slots assigned to it, where N is the total number of Listeners.

At step 324, for each Tree i, the number of Child Slots assigned to that Tree so far, Ci, is counted. The shortfall in the number of Child Slots assigned to that Tree, Si, is then calculated as N−1−Ci. At step 326, the Tree i with the maximum Si is selected as the Tree to which the next Listener will be assigned as a Branch Listener. An open Child Slot of a Branch Listener in that Tree is chosen as the connection point for the next Branch Listener. This is called the target Child Slot. The choice of the next target Child Slot is arbitrary, except that it must be as shallow in the Tree as any other open Child Slot. Note that the chosen Child Slot must have been assigned as a Child Slot for Tree i. It is possible with this algorithm for less than all of the Child Slots of a given Branch Listener of a Tree to be assigned to that Tree.

At step 328, a Listener is selected to be the next Branch Listener. The Listener L with the most unassigned Child Slots is chosen. In case of a tie, the Listener which was previously attached to the target Child Slot is chosen. If there is no such Listener, then a Listener which was previously a Branch Listener at the deepest level in that Tree is chosen. If there is no such Listener, then any arbitrary Listener is chosen. If there are no Listeners left with unassigned Child Slots, then the LTB network has too many freeloaders. In this case, one or more freeloading Listeners are removed from the LTB network, and the Placement Algorithm is restarted at step 320.

At step 330, Listener L is assigned as a Branch Listener to Tree i. It is attached to the target Child Slot. Up to Si of L's unassigned Child Slots are assigned to Tree i. The algorithm then loops back to step 324. At this step, if the shortfall, Si, for each Tree i is zero, then the Branch Listeners have all been assigned, and the loop is complete. At this point, it is guaranteed that there are sufficient unattached Child Slots assigned to each Tree, among that Tree's Branch Listeners, to accommodate the rest of the Listeners. At step 332, for each Tree, and for each Listener which is not a Branch Listener of that Tree, that Listener is made a Leaf Listener of that Tree. It is attached to an unattached Child Slot assigned to that Tree. The first preference is to attach the Listener to the same Child Slot is was previously attached to on that Tree. Barring that, it is attached to any available Child Slot. Finally, for each change in a Feed Connection of each Listener, a corresponding Modification Object is produced.

At step 334, the Placement Algorithm is complete, each Listener having been assigned as either a Branch Listener or Leaf Listener of each Tree, and a set of Modification Objects expressing the required changes having been produced. As described previously in FIG. 7, these Modification Objects are turned into Connect Objects and sent to Listeners, to bring the new LTB network configuration into being.

The generalized Placement Algorithm is also used to remove Listeners from the LTB network. In the preferred embodiment, the procedure for removing a Listener is illustrated in FIG. 8. In this algorithm, the most-recently-added Listener is moved to fill the place of the departing Listener. However, this algorithm doesn't work when each Listener may have a different Fanout. In this case, the generalized Placement Algorithm must be used. The algorithm is designed to work efficiently (that is, result in a small number of Modification Objects) for both adding and removing Listeners. The procedure, then, is to simply remove the departing Listener from the list of Listeners, then re-apply the generalized Placement Algorithm.

The generalized Placement Algorithm is also used when a Listener changes her Fanout. The procedure here is for the Listener to signal a desire to change (i.e. to increase or reduce) their Fanout, by way of a Fanout Change Object being sent to the Broadcast Manager. This causes the Broadcast Manager to reapply the Placement Algorithm, accommodating the change.

Using n-ary Trees with Balanced n-Channel LTB Networks

In the embodiment of which FIG. 14 is an example, which implements a Balanced n-Channel LTB network where n is even, the Trees are implemented as balanced binary trees. Each Listener is a Branch Listener in n/2 Trees, and a Leaf Listener in the other n/2 Trees. In another embodiment, described here, the Trees are implemented as balanced n-ary trees. For example, in the case of a Balanced 4-Channel LTB network, each of the 4 Trees is a balanced quaternary tree—each node having up to 4 children.

The advantage of this embodiment is that the maximum number of transmission steps is greatly reduced. With binary Trees, the maximum number of steps is given by (1+floor[$\log_2(N)$]). By contrast, the maximum number of steps for a quaternary Tree is given by (1+floor[$\log_4(N)$]). In other words, the maximum number of steps with quaternary Trees is roughly the half the maximum number of steps with binary Trees. For example, with 1000 Listeners, the maximum number of transmission steps with a binary Tree is 10, while with quaternary Tree, it is 5. Meanwhile, a quaternary Tree embodiment requires the same number of connections as a binary Tree embodiment.

The same principle applies for any number of Channels. In general, with a Balanced n-Channel LTB network, employing an n-ary Tree method in place of a binary Tree method reduces the maximum number of transmission steps required to transmit any Channel from the Originator to any Listener by a factor of n/2, while requiring the same number of connections. Even more generally, in an irregular LTB network, the maximum number of transmission steps is minimized by concentrating assigning all the Child Slots of each Listener to a single Tree.

Figure 23:
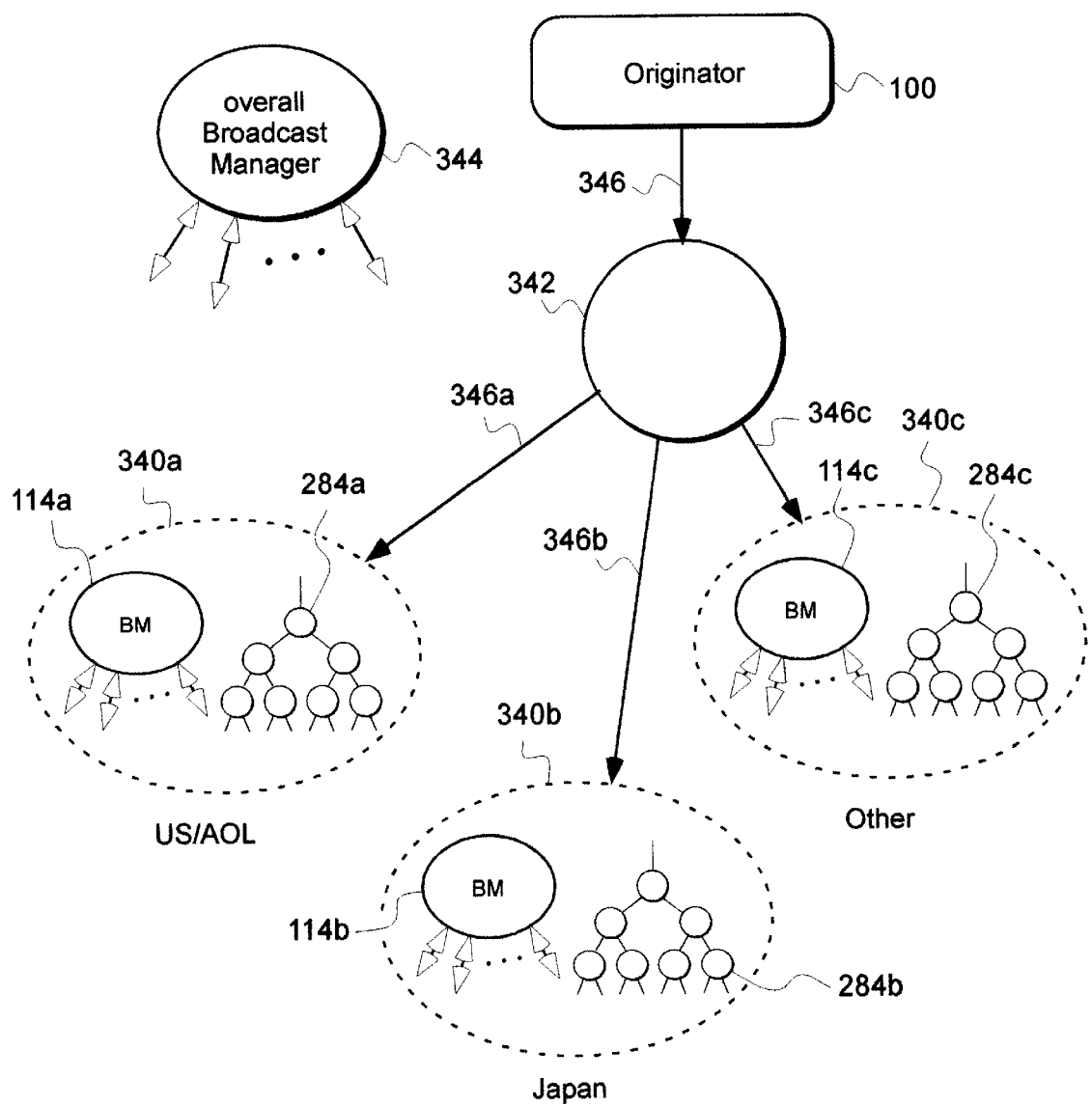
FIG. 23 shows a distributed Broadcast Manager embodiment.

FIG. 23—Distributed Broadcast Manager

FIG. 23 illustrates an embodiment employing a distributed Broadcast Manager, in which the functions of the Broadcast Manager are divided into several geographically separate parts. The Internet is distributed over a wide geographic area. Unicast connections and data transfers are generally made more quickly between users who are geographically close to each other than between users who are geographically distant. This localization effect can also apply within domains which share the same geographic area—for example, within a given city, unicast connections are likely to be faster between two AOL users than between an AOL user and an MSN user. It is generally possible to determine the relative closeness of two given users by examining their IP addresses. Here, closeness is used in the context of high speed connectivity—two users are close to the degree that unicast transmissions between them are fast.

When transmitting an LTB broadcast to a global audience, it is especially desirable to localize connections to the degree possible. The preferred embodiment makes no attempt to localize connections. In the single-Channel embodiment of FIG. 3, for example, it could be that the Originator is in the US, Listener L1 is in Japan, L2 is in the US, and L11 is in Japan. In this case, before L11 receives a given Frame, it has been transferred across the Pacific 3 times. A related problem is that of communication with the Broadcast Manager. Communication over large geographic distances is prone to being unreliable.

As illustrated in FIG. 23, the distributed Broadcast Manager embodiment splits the Broadcast Manager function among several local Broadcast Managers 114a–c, coordinated by overall Broadcast Manager 344. Local Broadcast Manager 114a controls local LTB network 284a. The combination is called an LTB Sub-network. The combination of local Broadcast Manager 114a and local LTB network 284a is LTB Sub-network 340a. Likewise, local Broadcast Manager 114b controls local LTB network 284b, the combination being LTB Sub-network 340b. Local Broadcast Manager 114c controls local LTB network 284c, the combination being LTB Sub-network 340c.

Prospective new Listeners connect to the overall Broadcast Manager. By examining the IP address of the prospective new Listener, the overall Broadcast Manager decides which of the LTB Sub-networks to assign the new Listener to. In the figure, Listeners whose IP addresses are determined to belong to AOL in the US are directed to LTB Sub-network 340a. Those whose WP addresses are determined to be in Japan are directed to LTB Sub-network 340b. All others are directed to LTB Sub-network 340c.

Ideally, each local Broadcast Manager runs on a machine within the domain it is servicing. A local Broadcast Manager behaves in mostly the manner described previously for Broadcast Managers in general. The map of the local LTB network is kept only by the local Broadcast Manager—not by the overall Broadcast Manager. After a Listener is directed to a local Broadcast Manager for a given broadcast, that Listener continues interacting with that local Broadcast Manager for that broadcast, and has no further interaction with the overall Broadcast Manager. The only change to the behavior of a local Broadcast Manager is that it is given instructions by the overall Broadcast Manager for establishing Feed Connections to the root of each Tree.

The Feed Connections for the root of each Tree, one Tree for each Channel, are referred to collectively as a Feed Connection set. The Originator 100 transmits over Feed Connection Set 346 to Dedicated Listener 342. The roots of LTB Sub-networks 340a–c are connected to the Dedicated Listener over Feed Connection sets 346a–c, respectively. Each Tree of each LTB Sub-network is assigned a different Child Slot on the Dedicated Listener, as coordinated by the overall Broadcast Manager. The purpose of the Dedicated Listener is to provide enough Fanout to transmit in parallel to each LTB Sub-network. In another embodiment, no Dedicated Listener is used—instead, the Originator provides the required Fanout. The Dedicated Listener is not associated with an Internet user, but in all other respects, it behaves like a normal Listener. It is present throughout the life of the LTB broadcast. The local Broadcast Managers are informed, by way of an appropriately formatted object sent by the overall Broadcast Manager, of the address of the Dedicated Listener.

From the perspective of the overall Broadcast Manager, the LTB network consists of an Originator, a single Branch Listener (the Dedicated Listener), and some number of Leaf Listeners, each Leaf Listener being an LTB Sub-network. Except for changing the Originator, or adding or removing LTB Sub-networks, the overall Broadcast Manager's map of the LTB network never changes.

By dividing the function of the Broadcast Manager among several local Broadcast Managers, and by grouping local Listeners together, the present embodiment achieves increased reliability and greater speed, while reducing overall network traffic.

FIGS. 24a and 24b—On-Demand Redundancy

In the previously described embodiments employing redundant Channels, all Channels are transmitted and received at all times. In the generalized method depicted in FIG. 20, all N Channels are broadcast continually, even though only R Channels (i.e. the number of Real Channels) are required to reconstruct the Data Stream.

In the present embodiment, only R Frames of each Frame Set are sent. The other (N–R) Frames are referred to as Backup Frames. In the event that a Listener fails to receive one or more expected Frames of a Frame Set, after a timeout interval, the Listener sends Backup Request Objects to one or more Feeds, requesting one or more Backup Frames. Each Backup Request Object contains the Frame number of a requested Backup Frame.

In order to ensure an even bandwidth distribution between all the Channels, it is necessary to transmit a certain pattern of Frames from each Frame Set. The pattern exists over a series of Frame Sets. FIG. 24a shows one such possible pattern in the case of a 4 Channel LTB network with one redundant Channel. The Channels are labeled C1 through C4. In the first Frame Set of the pattern, only Frames from C1, C2 and C3 are transmitted. These correspond to Frame numbers 0, 1 and 2. Frame number 3, which is part of Channel C4, is not transmitted, but is retained as a Backup Frame. Backup Frames are shown in parentheses. In the second Frame Set of the pattern, the Frames for Channels C1, C2 and C4 are transmitted, while C3 is retained as a Backup Frame. In the third Frame Set, C1, C3 and C4 are transmitted, and C2 is retained. In the fourth Frame Set, C2, C3 and C4 are transmitted, and C1 is retained. Thus, after every 4 Frame Sets are transmitted, an equal number of Frames have been transmitted over each Channel. FIG. 24b shows a possible pattern in the case of a 5 Channel LTB network with two redundant Channels. The pattern repeats after every 5 Frame Sets. In general, it can be seen that an appropriate pattern can be devised spanning N Frame Sets in the case of an N Channel LTB network. An appropriate pattern is one which results in an equal number of Frames being transmitted over each Channel. Each set of N Frame Sets over which this pattern is repeated is called a Frame Set Block. Each Frame Set Block consists of (N×N) Frames.

The Frame Set Block number of a given Frame is n/(N×N). Two Frames with the same Frame Set Block number are in the same Frame Set Block. In order for this to hold true, it may be necessary for the Frame number to wrap around early. For example, with a 10 bit Frame number, the highest possible Frame number is 1023. However, with a 5-Channel LTB network, the Frame number must wrap around from 999 to 0, rather than from 1023 to 0. In this way, the final Frame Set Block (consisting of 25 Frames) is made to be complete. In the case of a 4-Channel LTB network, the Frame number can wrap from 1023 to 0, since Frame Set Blocks consist of 16 Frames.

The Frame Set Block pattern is understood by each Listener. Thus, for any given Frame Set, a Listener can calculate which position that Frame Set occupies in the Frame Set Block pattern, and therefore, which Frames of that Frame Set to expect. In the event that one or more expected Frames is not received before a timeout interval, called the Backup Frame Timeout interval, the Listener sends a Backup Request Object to any Feed which is known to have a Backup Frame of the Frame Set. The Backup Request Object specifies the Frame number of the requested Frame. If no Frame is forthcoming before another Backup Frame Timeout interval, the Listener sends a Backup Request Object to another Feed known to have a Backup Frame, and so on. In the event that a Backup Frame is eventually received, the missing Frame is regenerated, as previously described, and is transmitted to any Children attached to the Channel of the missing Frame.

In general, when a redundant LTB network is employed, is desirable to increase the Keepalive Timeout Interval. This is because the redundancy allows fairly long lapses in network connectivity to be tolerated, while still producing a Data Stream without any gaps. In the preferred embodiment of any redundant LTB network, the Keepalive Timeout Interval is 1 minute. In the case of an LTB network with on-demand redundancy, the Backup Frame Interval is set to be a small fraction of the Keepalive Timeout Interval—in the preferred on-demand redundant LTB network embodiment, the Backup Frame Interval is 5 seconds.

By using an on-demand redundant LTB network, it is possible to derive most of the benefits of a continuously-redundant LTB network, but without paying the price in terms of wasted transmission bandwidth. When a lapse in network connectivity occurs, a Listener requests missing Frames as needed from already-connected Feeds. The Broadcast Manager is not involved unless the lapse in network connectivity is so long that the Keepalive Timeout Interval expires. Meanwhile, due to the overall design, no Listener is required to transmit at a greater bandwidth than they can support, even in the worst-case event that they are requested to transmit all of their Backup Frames.

Conclusion

Thus the reader will see that the present invention allows a broadcast originator to disseminate a broadcast over the Internet without herself having to supply or arrange for the necessary transmission bandwidth. Instead, those listening to the broadcast automatically supply the transmission bandwidth.

Furthermore, the reader will see the advantages in the method whereby each listener is called upon to retransmit at the same bandwidth as they receive. In this way, the usable broadcast bandwidth maximized. In addition, the incremental cost for the bandwidth required to transmit to each listener is borne by that listener. This cost distribution model is uniquely rational. The advantage of applying this same cost distribution model to the distribution of large files is apparent.

The advantage of the present invention in minimizing the latency of a broadcast is also clear. A very simple embodiment of the present invention would employ a daisy chain of listeners, one retransmitting to the next, resulting in a broadcast with an exceedingly large number of retransmission steps. The present invention teaches methods which implement a balanced tree structure, while at the same time allowing each listener to retransmit at the same bandwidth they receive—even for listeners who are retransmitting to multiple children. Because the balanced tree structure reduces the maximum number of retransmission steps to the log of the number of listeners, it becomes practical to implement a broadcast with a very large number of listeners.

There are clear advantages in the methods taught for providing redundant pathways for the data stream. In a simple embodiment of the present invention, without redundant pathways, a blockage by any listener would result in a blockage for all downstream listeners. With redundant pathways, temporary network blockages are dynamically bypassed. It thereby becomes practical to reliably broadcast to a large number of listeners.

What has been disclosed is merely illustrative of the present invention. Other arrangements can be implemented by those skilled in the art without departing from the spirit and scope of the present invention.

I claim:

1. A method of managing a broadcast over a global packet-switched network of a data stream having a bandwidth, the data stream represented as a plurality of data packets, the data stream originating from at least one originator, and received by a plurality of listeners, wherein each listener converts the data stream into a human perceivable form, and at least one listener is capable of deriving a packet from at least one received packet, and sending a derived packet using a unicast protocol over the global packet-switched network to at least one other listener; comprising the steps of:
   a) maintaining a pattern of interconnections between a group of listeners, wherein the pattern is maintained so that at least one listener does not receive any packets directly from the originator;
   b) establishing a flow of data from an originator to the group of listeners by the steps of:
      i) instructing the originator to send packets to at least one selected listener;
      ii) instructing at least one selected listener to derive packets from at least one received packet and to send derived packets to at least one other listener in the group wherein each listener converts the data stream into a human perceivable form; and
      iii) repeating step ii until listeners are instructed to derive and send packets so that packets sufficient to reconstruct the data stream will be sent to all listeners in accordance with the pattern;
so that each listener receives the broadcast substantially concurrently as it is transmitted by the originator.

2. The method of claim 1, further comprising the step, after step (b), of revising at least one pattern in response to a change in the group of listeners, and repeating the method from step (b).

3. The method of claim 2, in which the change is a new listener joining the group.

4. The method of claim 2, in which the change is a listener leaving the group.

5. The method of claim 1, in which, in step (b)(ii), at least one of the selected listeners which does not receive packets from the originator is instructed to send to a plurality of other listeners.

6. The method of claim 5, in which at least one pattern of interconnections is in the form of a tree having a root node and a plurality of nodes, with each node in the tree being a listener, and with the originator connected to the root node of the tree.

7. The method of claim 6, in which the tree is substantially balanced, such that the maximum number of listeners through which a packet will pass is substantially minimized.

8. The method of claim 1, further comprising the steps of:
   a) at least one listener sending a special packet, containing statistical information, to a listener from which the listener receives packets in the data stream;
   b) a selected listener combining the statistical information in received special packets from at least one listener with the selected listener's own statistical information, to create combined statistical information for the selected listener and other listeners;
   c) the selected listener sending a special packet containing the combined statistical information to a listener from which the selected listener receives packets in the data stream; and
   d) repeating steps b) and c), until the originator receives a special packet containing the combined statistical information from a plurality of listeners.

9. The method of claim 8, further comprising the step of computing a network latency from data in the special packet.

10. The method of claim 1, in which:
   a) in step (a), a plurality of patterns of interconnections are maintained, each pattern interconnecting the listeners in the group, and at least one listener being connected to a different set of other listeners in each pattern, and the originator being connected to at least one listener in each pattern;
   b) the originator produces a plurality of channels, each channel comprising a stream of packets derived from the data stream, each channel having a bandwidth, one channel corresponding to each pattern; and
   c) for each channel, the originator transmits the packets for that channel to at least one selected listener according to the pattern corresponding to that channel, and the packets in each channel are sent through the pattern;
so that each of the listeners receives packets from two or more channels, sufficient to reconstruct the data stream.

11. The method of claim 1, in which the data stream represents content selected from a group comprising audio programming, video programming, multimedia programming, and advertising information.

12. A method of managing a broadcast over a global packet-switched network of a data stream having a bandwidth, the data stream represented as a plurality of data packets, the data stream originating from at least one originator, and received by a plurality of listeners, and at least one listener is capable of deriving a packet from at least one received packet, and sending a derived packet using a unicast protocol over the global packet-switched network to at least one other listener; comprising the steps of:
   a) maintaining a plurality of patterns of interconnections between a group of listeners, each pattern interconnecting the listeners in the group, and at least one listener being connected to a different set of other listeners in each pattern, and at least one listener having no connections to the originator, and the originator being connected to at least one listener in each pattern;
   b) instructing at least one originator to produce a plurality of channels, each channel comprising a stream of packets derived from the data stream, each channel having a bandwidth less than the bandwidth of the data stream;
   c) establishing a flow of data from an originator to the group of listeners by the steps of:
      i) instructing the originator to send packets for a channel to at least one selected listener, according to a pattern;
      ii) instructing at least one selected listener to derive a channel comprising a stream of packets derived from received packets, the bandwidth of the channel being less than the bandwidth of the data stream, and to send packets for the derived channel to at least one other listener in the group, according to the pattern wherein each listener converts the data stream into a human perceivable form; and
      iii) repeating step ii until listeners are instructed to derive and send packets so that packets sufficient to reconstruct the data stream will be sent to all listeners;
wherein at least one listener not connected to any originator receives from no other single listener a set of channels whose combined bandwidth is equal to or greater than the bandwidth of the data stream; so that each listener receives packets from two or more channels, sufficient to reconstruct the data stream.

13. The method of claim 12, further comprising the step, after step (c), of revising at least one pattern in response to a change in the group of listeners, and repeating the method from step (c).

14. The method of claim 13, in which the change is a new listener joining the group.

15. The method of claim 13, in which the change is a listener leaving the group.

16. The method of claim 12, in which each channel receives a substantially equal portion of the data stream.

17. The method of claim 16, in which each pattern is in the form of a tree having a root node and a plurality of nodes, with each node in the tree being a listener, and with the originator connected to the root node of the tree, so that a majority of the plurality of listeners is a leaf node in at least one tree.

18. The method of claim 17, in which each tree is substantially balanced, such that the maximum number of listeners through which a packet will pass is substantially minimized.

19. The method of claim 12, in which at least one of the listeners can recreate missing packets in a channel by using packets from at least one other channel.

20. The method of claim 12, in which the steps are performed by a broadcast manager separate from the originator and listeners, and the steps are performed by the broadcast manager sending commands over the global packet-switched network to the originator and the listeners.

21. The method of claim 12, in which at least one of the listeners is instructed to send packets to at least one originator, so that the originator receives packets sufficient to reconstruct the data stream.

22. The method of claim 12, further comprising the steps of:
   a) at least one listener sending a special packet, containing statistical information, to a listener from which the listener receives packets in the data stream;
   b) a selected listener combining the statistical information in received special packets from at least one listener with the selected listener's own statistical information, to create combined statistical information for the selected listener and other listeners;
   c) the selected listener sending a special packet containing the combined statistical information to a listener from which the selected listener receives packets in the data stream; and
   d) repeating steps b) and c), until the originator receives a special packet containing the combined statistical information from a plurality of listeners.

23. The method of claim 22, further comprising the step of computing a network latency from data in the special packet.

24. The method of claim 12, in which the data stream represents content selected from a group comprising audio programming, video programming, multimedia programming, and advertising information.

25. The method of claim 12, in which the data stream represents a data file, and the data file is broadcast a plurality of times, so that listeners may make local copies of the file.

26. A method for a first listener to receive a data stream being broadcast over a global packet switched network, the data stream being represented as a plurality of data packets, the data stream originating from at least one originator, and received by a plurality of listeners other than the first listener, at least one of which retransmits part or all of the data stream over the packet switched network to another listener, comprising the steps of:
   a) submitting to a broadcast manager a request to receive a data stream;
   b) forming connections with at least one other listener in response to at least one instruction from the broadcast manager;
   c) receiving a channel consisting of a stream of packets over each of one or more connections formed in step (b); and
   d) reconstructing the data stream from the channels, and converting it into a human perceivable form;
so that the first listener receives the broadcast from other listeners, as received by them from other listeners, and ultimately from the originator, substantially concurrently as the originator transmits the data stream.

27. The method of claim 26, further comprising the steps of:
   e) forming connections with at least one other listener in response to at least one instruction from the broadcast manager; and
   f) transmitting each of one or more first channels, each first channel consisting of a stream of packets derived from at least one channel received at step (c), to at least one listener connected with at step (e);
so that the first listener participates in transmitting the broadcast to at least one other listener.

28. The method of claim 27, further comprising the step of notifying the broadcast manager of a failure to receive packets expected at step (c).

29. The method of claim 27, further comprising the steps of:
   h) notifying the broadcast manager of an intention to leave the broadcast;
   i) receiving at least one connection instruction from the broadcast manager;
   j) sending at least one connection instruction received at step (i) to one or more other listeners, those listeners in turn either sending those instructions to still other listeners, or forming new connections to one or more listeners based on those instructions; and
   k) closing connections to all listeners connected to at steps (b) and (e);
so that the listeners connected to the first listener form new connections over which they continue to receive the data stream, other than from the first listener, and the first listener stops receiving channels from any other listeners.

30. The method of claim 27, wherein at step (e), the first listener forms connections to a plurality of other listeners in response to at least one instruction from the broadcast manager.

31. The method of claim 26, wherein at step (b), the first listener forms connections to a plurality of other listeners in response to at least one instruction from the broadcast manager, and at step (c), the first listener receives a channel over each of a plurality of connections formed.

32. The method of claim 26, wherein at step (c), no single listener provides sufficient packets to reconstruct the data stream.

33. The method of claim 32, wherein the data stream has a bandwidth, and each channel has a bandwidth, and at step (c), the bandwidth of each channel is less than the bandwidth of the data stream, and the sum of the bandwidths of channels being sent by each listener is less than the bandwidth of the data stream.

34. The method of claim 27, further comprising the steps of:
   g) reconstructing at least one missing packet of a channel from at least one packet received on at least one other channel; and
   h) transmitting at least one reconstructed packet over at least one connection formed at step (e);
so that a channel whose reception is interrupted is reconstructed from other channels, so that the reception and retransmission of the data stream is not interrupted.

35. The method of claim 32, wherein the bandwidth of each channel is substantially equal.

36. The method of claim 26, further comprising the steps of:
   e) forming a connection with an originator in response to an instruction from the broadcast manager; and
   f) transmitting each of one or more first channels, each first channel consisting of a stream of packets derived from at least one channel received at step (c), to the originator connected with at step (e);
so that the listener participates in transmitting the broadcast back to the originator, so the originator can monitor the broadcast.

37. The method of claim 27, further comprising the steps of:
   g) receiving at least one special packet containing statistical information over at least one connection formed at step (e);
   h) combining the statistical information received in at least one special packet received at step
   (g) with the first listener's own statistical information, to create combined statistical information; and
   i) sending a special packet containing the combined statistical information over at least one connection formed at step (b);
so that combined statistical information is propagated, and the originator eventually receives combined statistical information from a plurality of listeners.

38. The method of claim 37, wherein the statistical information is derived from a delay between transmission of a portion of the data stream by the originator, to receipt of that portion by the first listener, so that the originator can monitor the latency of the broadcast.

39. The method of claim 26, in which the data stream represents content selected from a group comprising audio programming, video programming, multimedia programming, and advertising information.

40. A method for an originator to broadcast a data stream over a global packet switched network to a plurality of listeners, the data stream being represented as a plurality of data packets, wherein at least one listener is capable of sending a packet over the global packet-switched network to at least one other listener; comprising the steps of:
   a) submitting to a broadcast manager a request to broadcast a data stream;
   b) establishing a flow of data to the group of listeners by the steps of:
      i) forming connections with two or more listeners in response to at least one instruction from the broadcast manager;
      ii) formatting a derivative of the data stream into a stream of packets;
      iii) dividing the packets between a plurality of channels, so that the bandwidth of each channel is less than the bandwidth of the data stream; and
      iv) transmitting a channel to each of two or more listeners with which connections were formed in step (b)(i), such that no more than one channel is sent to each listener;
wherein at least one listener to which a channel was transmitted in step (b)(iv), sends at least one channel derived from at least one received channel to at least one other listener, until at least one listener receives packets sufficient to reconstruct the data stream and converts the data stream into a human perceivable form.

41. The method of claim 40, wherein at step (b)(i), connections are formed to two or more listeners, and at step (b)(iv), channels are transmitted to two or more listeners with which connections were formed at step (b)(i).

42. The method of claim 41, wherein at step (b)(iii), at least one channel can be derived from two or more other channels, so that redundancy is added to the transmission to provide a degree of error tolerance.

43. The method of claim 42, wherein the bandwidth of each channel is substantially equal.

44. The method of claim 40, wherein the data stream represents a data file, and the data file is broadcast a plurality of times.

* * * * *